United States Patent
Favre

(10) Patent No.: US 11,207,694 B2
(45) Date of Patent: Dec. 28, 2021

(54) PACKAGING DRY LEAVES IN SEALED CAPSULES

(71) Applicant: TPRESSO AG, Zurich (CH)

(72) Inventor: Eric Favre, St-Barthelemy (CH)

(73) Assignee: TPRESSO AG, Zurich (CH)

(*) Notice: Subject to any disclaimer, the term of this patent is extended or adjusted under 35 U.S.C. 154(b) by 132 days.

(21) Appl. No.: 14/398,825

(22) PCT Filed: May 3, 2013

(86) PCT No.: PCT/IB2013/053535
§ 371 (c)(1),
(2) Date: Mar. 3, 2015

(87) PCT Pub. No.: WO2013/164798
PCT Pub. Date: Nov. 7, 2013

(65) Prior Publication Data
US 2015/0209792 A1    Jul. 30, 2015

(30) Foreign Application Priority Data

May 4, 2012 (EP) ..................................... 12166912

(51) Int. Cl.
*B02C 4/02* (2006.01)
*B65B 29/02* (2006.01)
(Continued)

(52) U.S. Cl.
CPC .................. *B02C 4/02* (2013.01); *A23F 3/00* (2013.01); *A23F 3/12* (2013.01); *B02C 4/30* (2013.01);
(Continued)

(58) Field of Classification Search
CPC ...... A23F 3/00; A23F 5/08; A23F 3/06; A23F 3/12; B02C 4/00; B02C 4/02; B02C 4/06;
(Continued)

(56) References Cited

U.S. PATENT DOCUMENTS 2,452,983 A * 11/1948 Birdseye ................. F26B 3/283
34/203
2,533,550 A    12/1950 Blackwell
(Continued)

FOREIGN PATENT DOCUMENTS

CN           102143800 A      8/2011
GB              238391        8/1925
(Continued)

OTHER PUBLICATIONS

International Search Report issued in PCT Application No. PCT/IB2013/053535.

*Primary Examiner* — Drew E Becker
*Assistant Examiner* — Bryan Kim
(74) *Attorney, Agent, or Firm* — Lucas & Mercanti, LLP; Klaus P. Stoffel

(57) ABSTRACT

A system for packaging tea in a sealed casing. the system includes a machine for breaking dried tea leaves, said machine comprising an inlet for supplying dried tea leaves, an outlet for releasing the broken tea leaves, and at least one breaker device including a first breaker member and a second breaker member that can be removed relative to the first breaker member, said first and second breaker member being configured to bend the dried tea leaves until they break.

10 Claims, 24 Drawing Sheets

(51) Int. Cl.
*A23F 3/00* (2006.01)
*B65B 31/02* (2006.01)
*B65B 59/04* (2006.01)
*A23F 3/12* (2006.01)
*B02C 4/30* (2006.01)
*B02C 4/42* (2006.01)

(52) U.S. Cl.
CPC .............. *B02C 4/42* (2013.01); *B65B 29/022* (2017.08); *B65B 31/028* (2013.01); *B65B 59/04* (2013.01); *B65B 31/02* (2013.01)

(58) Field of Classification Search
CPC .... B02C 4/10; B02C 4/12; B02C 4/16; B02C 4/32; B02C 4/34; B02C 4/38; B02C 4/18; B02C 4/20; B02C 4/24; B02C 4/26; B02C 4/30; B02C 4/42; B02C 4/286; B02C 4/423; B02C 23/02; B02C 18/16; B02C 18/22; B02C 18/2225; B02C 18/2241; B02C 18/225; B02C 18/24; B65B 29/02; B65B 31/02; B65B 31/021; B65B 31/024; B65B 31/025; B65B 29/022; B65B 1/08; B65B 35/34; B65B 37/04; B65B 29/025; B65B 29/028
USPC ................. 99/537–539, 546, 567, 635–643; 426/518
See application file for complete search history.

(56) References Cited

U.S. PATENT DOCUMENTS

| | | | | |
|---|---|---|---|---|
| 3,584,668 A * | 6/1971 | Neville | ............... | A01F 29/08 241/223 |
| 4,655,400 A * | 4/1987 | Erb | ............... | B02C 4/08 241/159 |
| 5,081,819 A * | 1/1992 | Cloud | ............... | B65B 1/366 425/373 |
| 5,993,867 A * | 11/1999 | Rohdewald | ............... | A61K 36/82 426/384 |
| 6,544,572 B1 * | 4/2003 | Nakada | ............... | A23N 15/04 426/481 |
| 8,757,527 B2 * | 6/2014 | Amano | ............... | B02C 7/08 241/224 |
| 2002/0110626 A1 * | 8/2002 | Buckingham | ............ | A23F 5/105 426/395 |
| 2004/0094642 A1 * | 5/2004 | Everson | ............... | B02C 4/02 241/30 |
| 2005/0260326 A1 * | 11/2005 | Kageyama | ............... | A23F 3/06 426/615 |
| 2007/0051836 A1 * | 3/2007 | Kirschner | ............... | A47J 42/36 241/30 |
| 2008/0085356 A1 * | 4/2008 | Colliver | ............... | A23F 3/06 426/597 |
| 2008/0194402 A1 * | 8/2008 | Chevigny | ............... | B01J 20/24 502/404 |
| 2011/0114775 A1 | 5/2011 | Lefebvre | | |
| 2011/0305792 A1 * | 12/2011 | Vella | ............... | A23F 5/02 426/2 |
| 2013/0042943 A1 * | 2/2013 | Bassani | ............... | B65G 27/04 141/11 |
| 2013/0177672 A1 * | 7/2013 | Robinson | ............... | A23F 3/30 426/72 |

FOREIGN PATENT DOCUMENTS

| | | | | |
|---|---|---|---|---|
| GB | 281922 | 12/1927 | | |
| GB | 281922 A | * 12/1927 | ............... | A23F 3/12 |
| GB | 559937 | 3/1944 | | |
| GB | 559937 A | * 3/1944 | ............... | A23F 3/12 |
| GB | 820726 | 9/1959 | | |
| GB | 1363754 | 8/1974 | | |
| GB | 2158338 | 11/1985 | | |
| IN | 857MUM2003 | 8/2003 | | |
| JP | S53113364 A | 10/1978 | | |
| JP | S61177547 A | 8/1986 | | |
| JP | H09122523 A | 5/1997 | | |
| JP | H1014495 A | 1/1998 | | |
| JP | H10136889 | 5/1998 | | |
| JP | H11510473 A | 9/1999 | | |
| WO | 2008129350 | 10/2008 | | |
| WO | 2010007633 | 1/2010 | | |

* cited by examiner

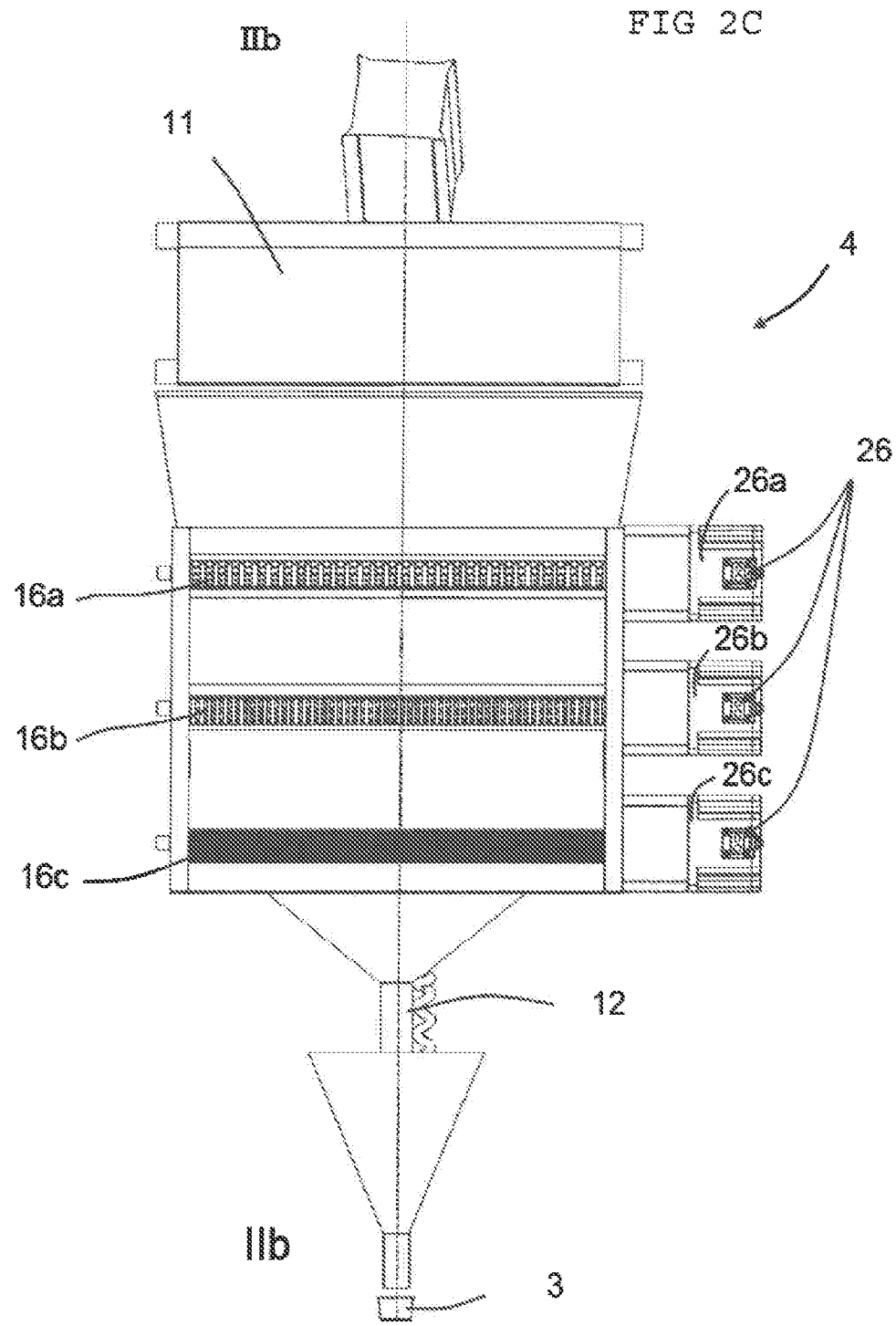

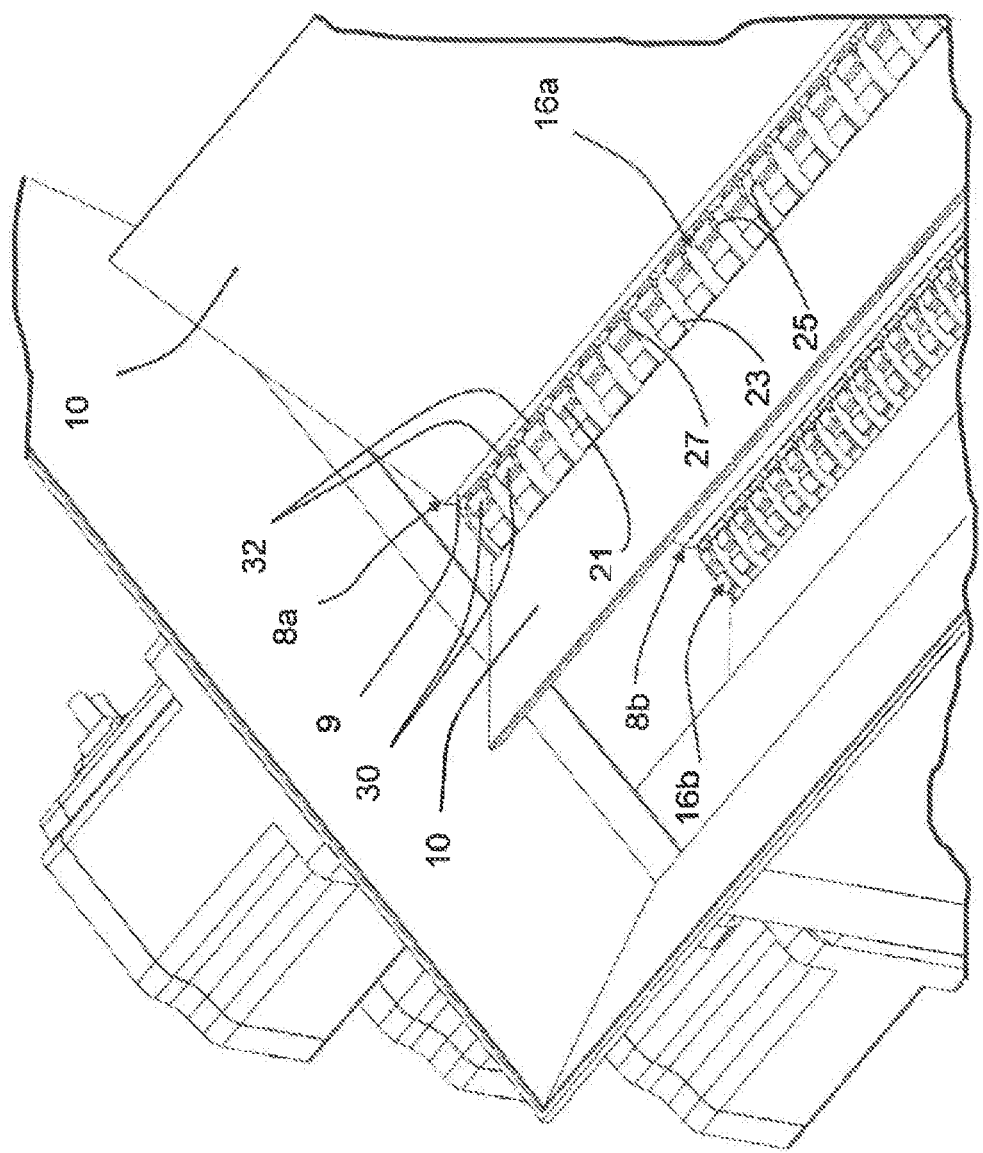

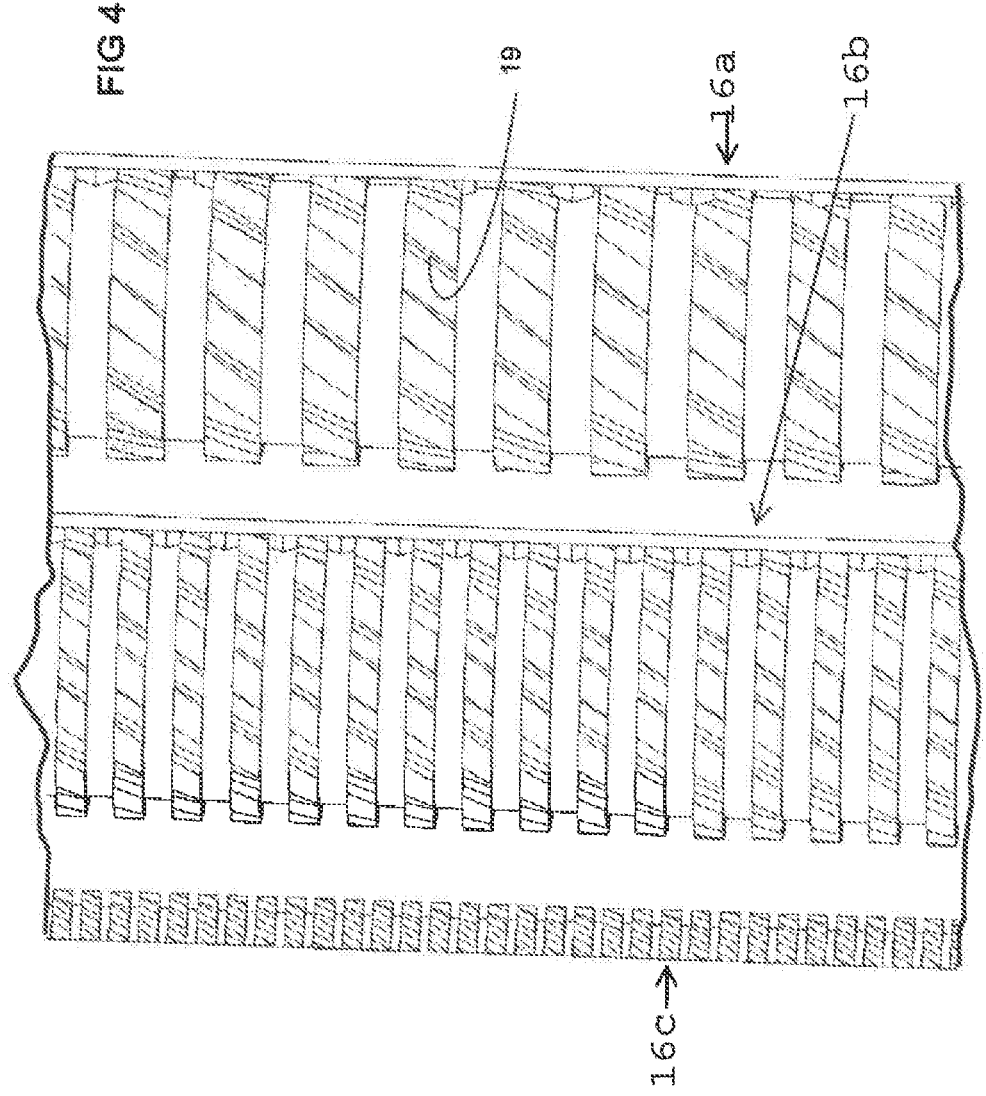

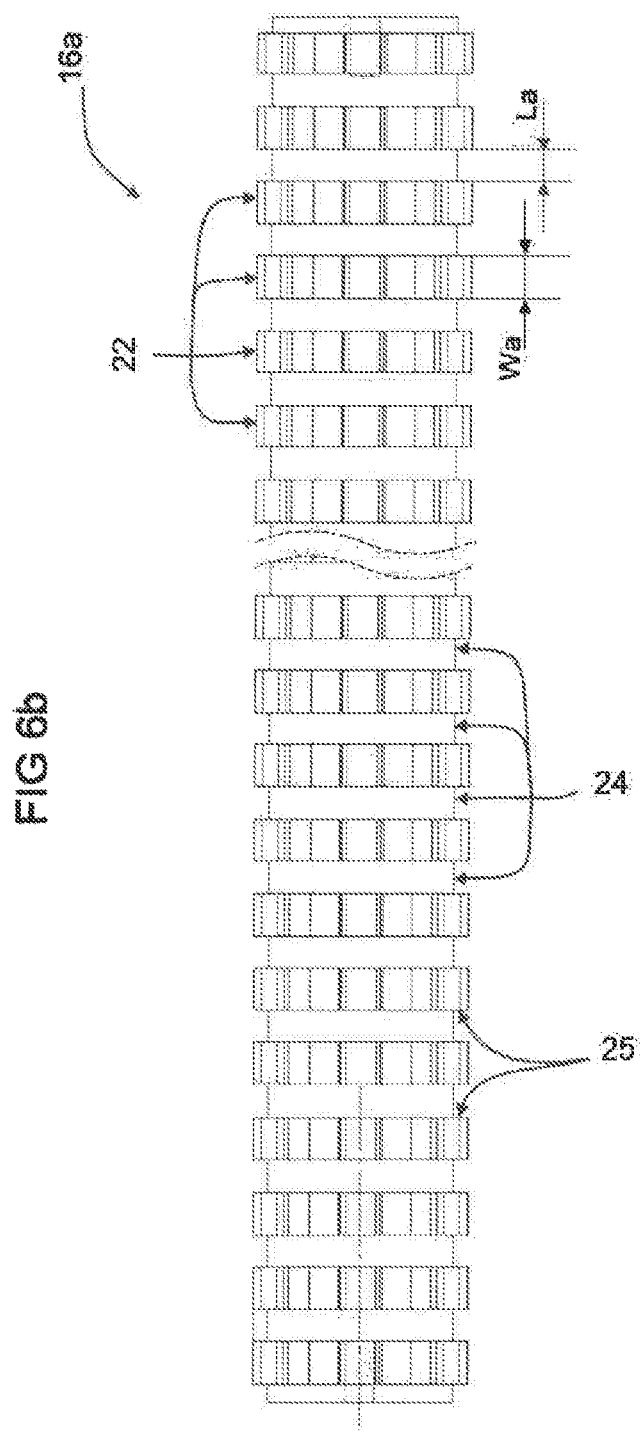

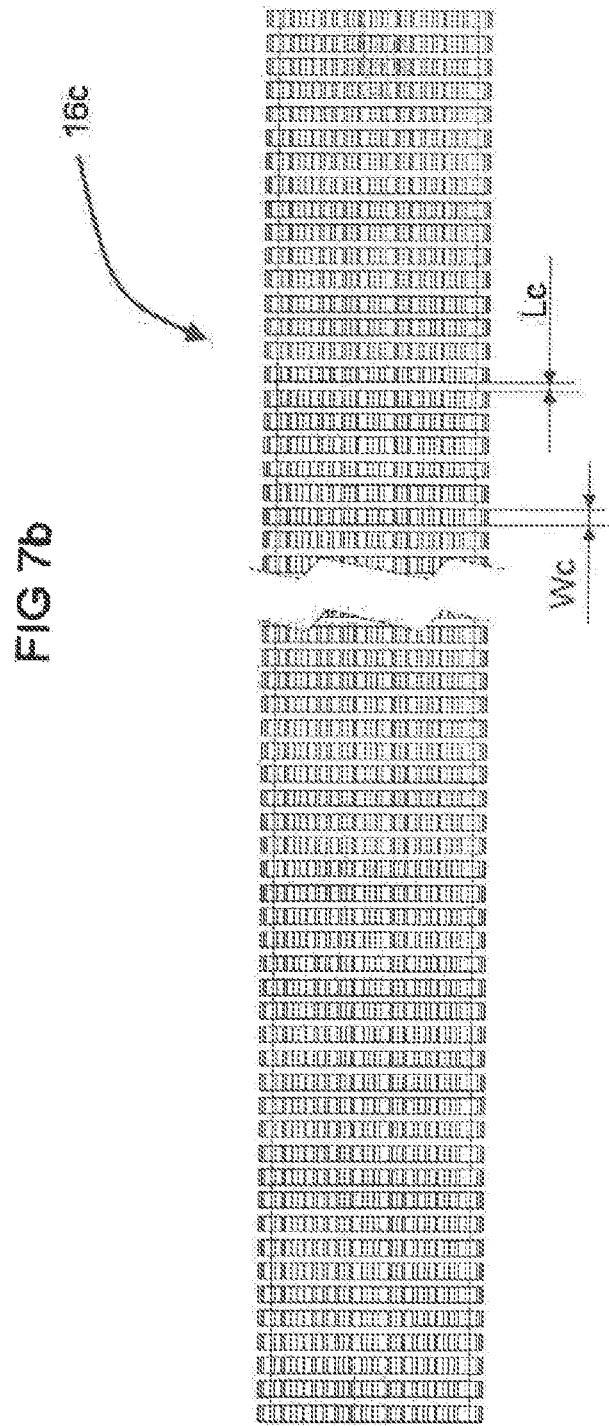

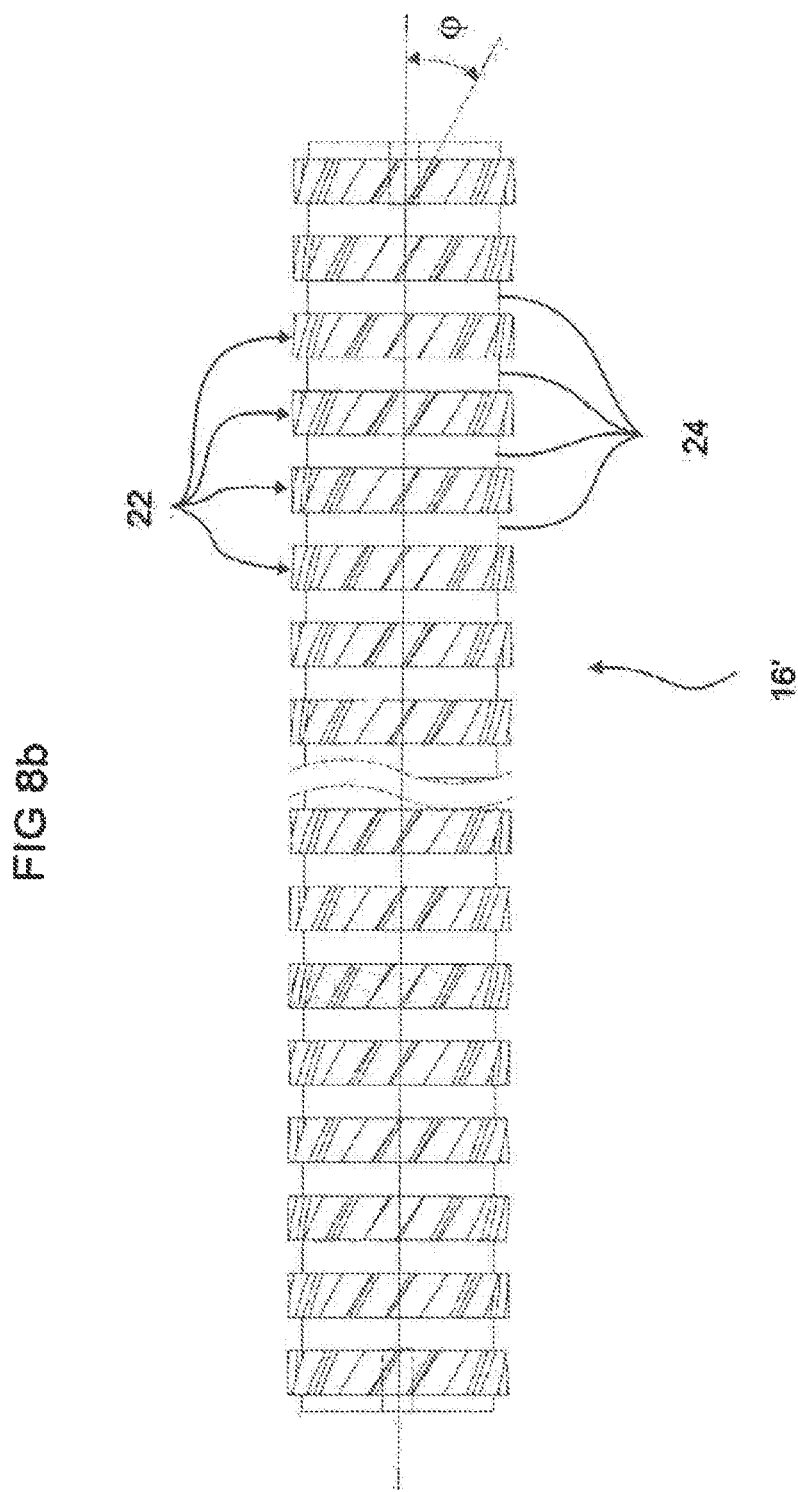

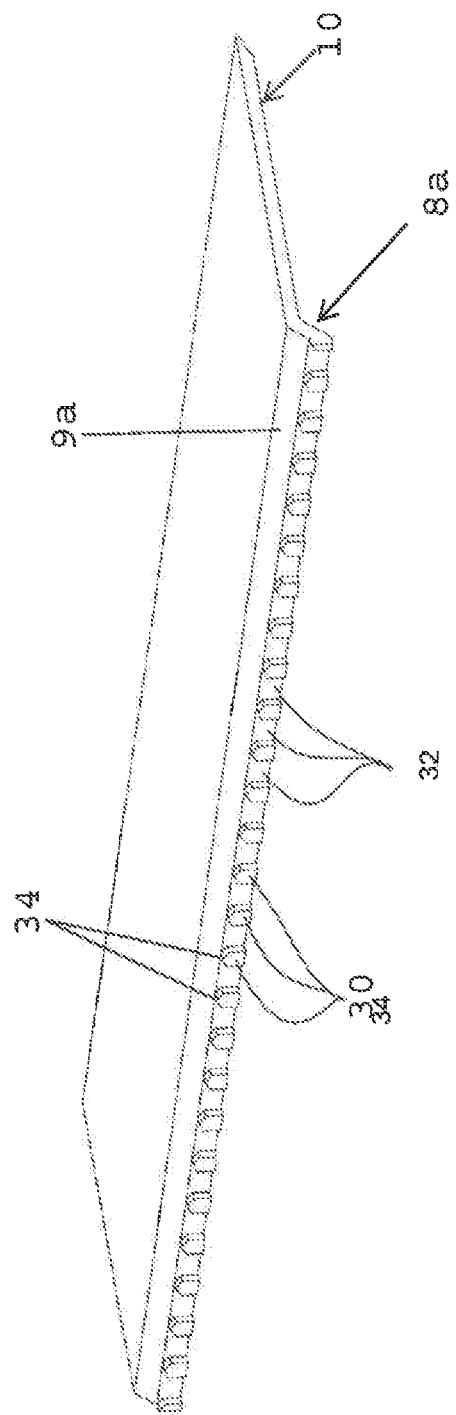

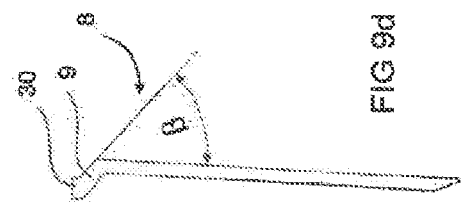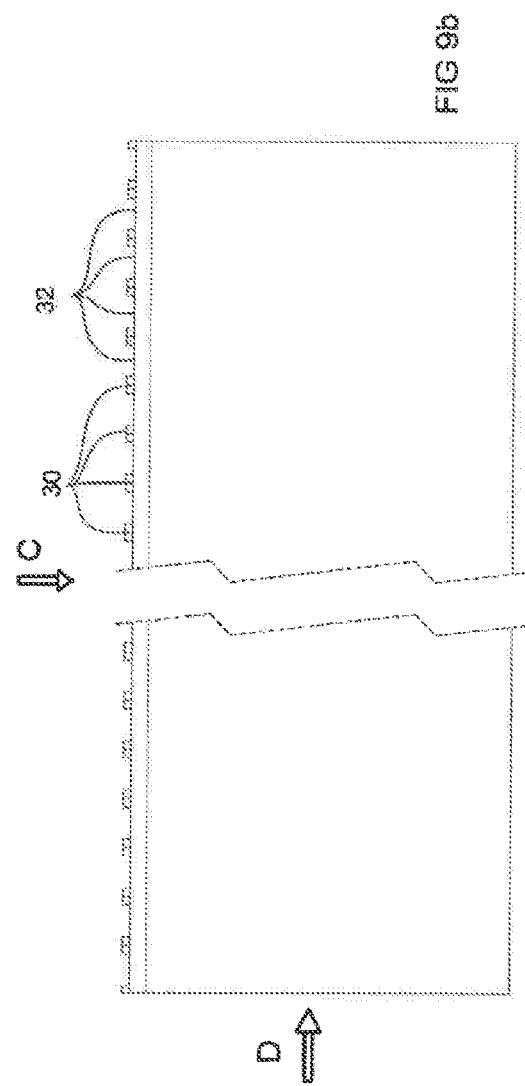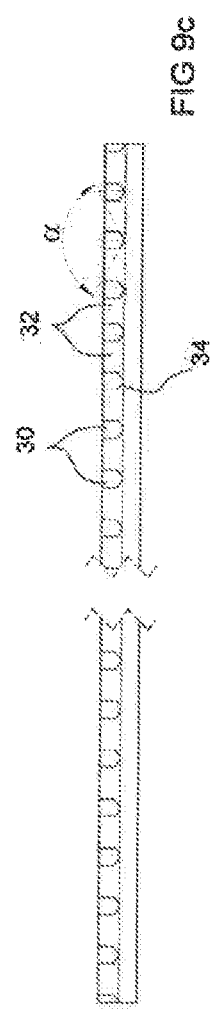

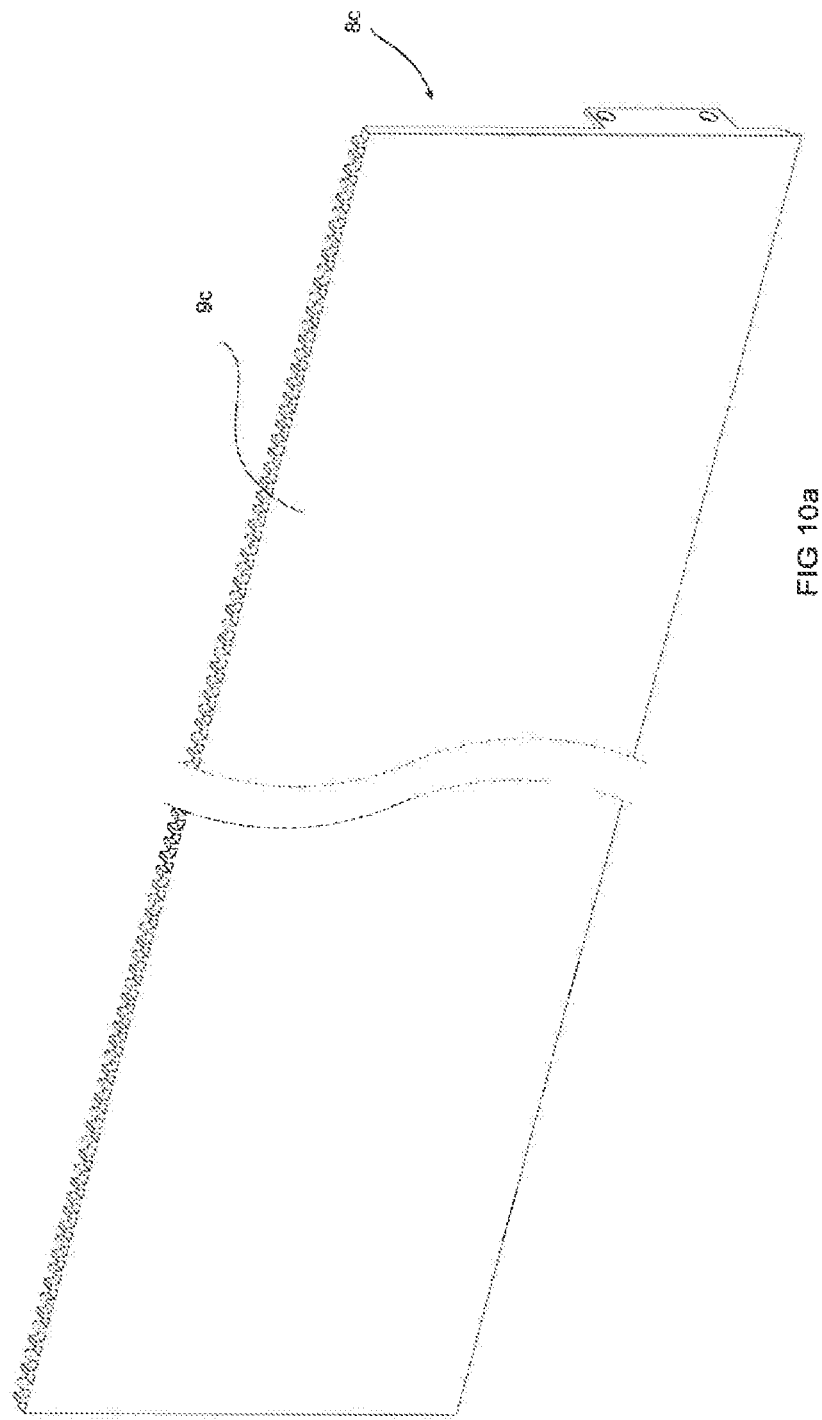

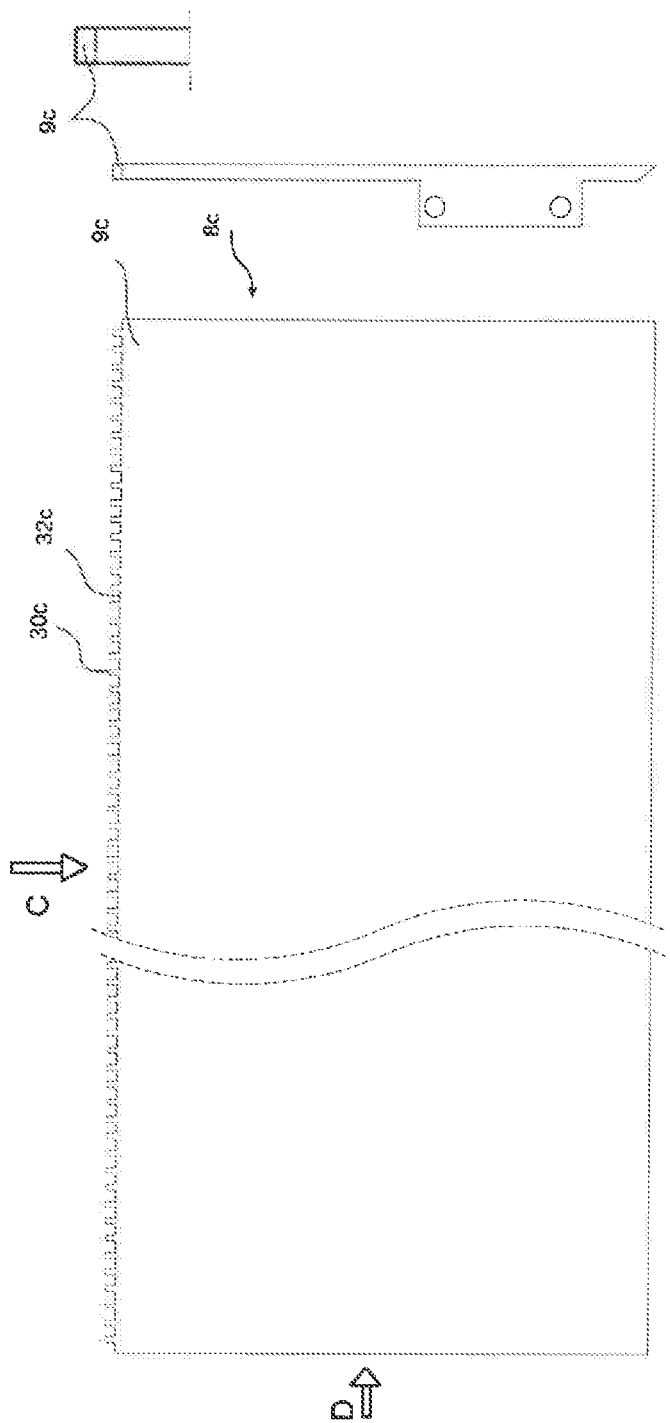

PACKAGING DRY LEAVES IN SEALED CAPSULES

This application is a U.S. national stage of PCT/IB2013/053535 filed on May 3, 2013 which claims the benefit of priority from European Patent Application No. 12166912.1 filed May 4, 2012, the contents of each of which are incorporated herein by reference.

SUMMARY

System for packaging tea in a hermetically sealed casing. The system includes a machine for breaking dried tea leaves. The machine comprises an inlet for supplying the dried tea leaves, an outlet for releasing the broken tea leaves, and at least one breaker device including a first breaker member and a second breaker member that can be removed relative to the first breaker member. The first and second breaker members are designed to bend the dried tea leaves until they break.

DESCRIPTION

Packaging of dried leaves in hermetically sealed casings

This invention is for a method of packaging dried edible leaves or stalks in hermetically sealed casings, the dried leaves or stalks comprising namely tea, herbal tea or aromatic herbs.

A known method exists for producing hermetically sealed casings containing substances such as coffee, broth or tea for making hot beverages. A method of packaging substances in casings is described for example in publications WO2008/129530 and WO2010/007633. Typically, the hermetically sealed casing is placed in a machine comprising an injection head and a perforating bottom wall. The injection head perforates one wall of the casing in order to inject hot water into the casing, and the perforating wall opens the opposite wall of the casing in order to extract the beverage once the water has passed through the substance contained in the casing. By packaging substances such as coffee or tea in hermetically sealed casings, the properties of the substance can be preserved for a relatively long period lasting until the beverage is prepared.

There are two possibilities as far as tea is concerned. Tea can be placed in the casing either as whole dried leaves, or as dried tea leaves that have been cut or crushed into pieces. If whole leaves are used, the extraction time is longer because the surface area is smaller than when extracting tea from cut leaves. When tea is extracted from casings by water injection machines, it is preferable for the extraction time to be as short as possible due to the way the machine operates. An extraction time of three to five minutes, which would be typical for the preparation of tea in a cup or in a teapot using a teabag or loose leaves, would not be acceptable for preparing tea from casings in an extraction machine. Moreover, irrespective of whether the tea leaves are whole or cut, oxidation of the surface reduces the quality of the tea in terms of taste and aroma. This problem is compounded if the tea leaves are cut into small pieces. The conventional approach is therefore to keep the tea leaves whole to ensure a high-quality taste, the disadvantage of this being a long extraction time.

Known methods of cutting or crushing tea leaves into pieces, such as those described in publications U.S. Pat. No. 2,533,550, GB281922 and GB820728, do not prevent surface oxidation of the pieces of leaves because the leaves are exposed to the air during the reduction processes. In addition, since the leaves form piles as they are sheared or crushed between two rollers turning in opposite directions, heat is produced as a result of friction or shearing which leads to faster sealing by oxidation and/or by drying out the exposed broken surface of the cut leaves. This reduces the ability of the leaf to absorb water quickly and also heats the exposed surface, which may also result in other chemical reactions that can alter the properties of the tea or other dried edible plants in terms of taste and aroma.

The problem described above can also affect the leaves of other dried edible plants such as herbs.

One objective of the invention is to provide a method of packaging dried leaves or stalks of edible plants in hermetically sealed casings and a machine for implementing the method in order to prepare a beverage or liquid nutrient with excellent properties in terms of taste and aroma.

One specific objective of the invention is to provide a method of packaging dried tea leaves in hermetically sealed casings and a machine for implementing the method in order to prepare tea with excellent properties in terms of taste and aroma.

It is advantageous to provide a method and a machine for packaging tea or another edible product in casings which can be used to prepare tea or another liquid nutrient in a short time. It is advantageous to provide a method and a machine for packaging tea or another edible product in hermetically sealed casings which can be used to prepare tea or another liquid nutrient with a very high level of extraction of the substances contained in the dried leaves. The objectives of the invention are achieved by the method including breaking the dried leaves or stalks in an environment of non-oxidizing gas; inserting the broken leaves into a casing in an environment of non-oxidizing gas; and hermetically sealing the casing; breaking the dried leaves or stalks involves bending them until they break, a system for packaging dried leaves or stalks of plants in hermetically sealed casings including a machine for breaking dried leaves; the machine comprising an inlet for supplying the dried leaves or stalks; an outlet for releasing the broken dried leaves or stalks; and at least one breaker device including a first breaker member and a second breaker member that can be removed relative to the first breaker member; characterized in that the first and second breaker members are configured to bend the dried leaves or stalks until they break and in that the machine comprises a source of neutral gas designed to provide an environment in the machine; including the said at least one breaker device; which prevents the oxidation of the leaves or stalks at the time of breaking until their insertion into the casing, and a machine having an inlet for supplying the dried leaves or stalks; an outlet for releasing the broken dried leaves or stalks; and at least one breaker device including a first breaker member and a second breaker member that can be removed relative to the first breaker member, wherein the first and second breaker members are configured to bend the dried leaves or stalks until they break and in that the machine comprises a source of neutral gas designed to provide an environment in the machine, including the said at least one breaker device, which prevents the oxidation of the leaves or stalks at the time of breaking.

This invention describes a method of packaging dried edible plants, particularly tea, in a hermetically sealed casing, involving breaking whole dried leaves in an environment of non-oxidizing gas, inserting the broken leaves into a casing in an environment of non-oxidizing gas and hermetically sealing the casing. Breaking the dried leaves or stalks involves bending them until they break. It is preferable to break the leaves in several stages, each subsequent stage breaking the leaves or stalks into smaller pieces than the previous stage.

This invention describes a system for packaging dried edible plants, particularly tea, in a hermetically sealed casing. The system includes a machine for breaking the dried leaves or stalks of edible plants, particularly tea. The machine comprises an inlet for supplying the dried leaves or stalks, an outlet for releasing the broken dried leaves or stalks, and at least one breaker device including a first breaker member and a second breaker member that can be removed relative to the first breaker member. The first and second breaker members are designed to bend the dried leaves or stalks until they break.

According to one aspect of the invention, the machine can advantageously comprise a source of non-oxidizing gas, such as nitrogen, designed to provide a gaseous environment in the machine in order to prevent the oxidation of the leaves or stalks at the time of breaking until their insertion into the casing.

According to one aspect of the invention, the machine can comprise a supply device positioned above the first breaker device, designed to generate a well-distributed shower of leaves or stalks falling individually onto the surface of the said first breaker member. The shower of leaves or stalks is preferably designed so that only one leaf or stalk lands in the cavity of the first breaker device at a time in the case of the majority of the leaves falling onto the first breaker device. Ideally, only one leaf or twig should be in each cavity at a time (shower effect) to prevent the leaves or stalks from being crushed and to guarantee the best possible conditions for breaking each dried leaf or stalk solely as a result of bending. In the invention, as well as generating a shower of leaves or stalks falling onto the first breaker device, the latter is made to move at a speed that can be adjusted to take into account the characteristics of the leaves or stalks, particularly the type, origin, moisture content and average size (diameter, length) of each leaf or stalk. The supply device can advantageously comprise a grid or vibrating tray with a drop edge along the entire length of the first breaker member, designed to generate a regular, fine shower or curtain of dried leaves or stalks along the entire length of the first breaker member.

The supply device can also comprise one or more grids or vibrating trays positioned upstream of the said grid or vibrating tray to prevent the leaves or stalks from piling up and to ensure optimum spacing between them. The machine can advantageously comprise multiple breaker devices, preferably at least three breaker devices.

The machine can advantageously comprise multiple breaker devices positioned one on top of the other, for example assembled one on top of the other vertically. In this embodiment, the broken leaves are transported from one device to the next by gravity. Other means of transporting the leaves between successive breaking devices, such as conveyor belts, vibrating conveyors or blown gas, can however be envisaged as part of this invention. The breaker devices do not have to be positioned vertically, but can instead be assembled horizontally or as a cascade, or even spaced apart. In this last alternative, the dried leaves could be broken as part of a chain or batch process. A batch process is divided into several independent or autonomous stages to break the leaves into pieces of gradually decreasing size.

In one embodiment, the first breaker member is removable and comprises a roller that is made to rotate by a motor. The roller can comprise active lines with an essentially cylindrical top surface interrupted by cavities designed to catch the dried leaves, the active lines being separated by grooves around the roller. The cavities have radial surfaces forming upper edges with the top surface, and the grooves have lateral surfaces forming side edges with the radial surfaces. It is advantageous if the depth of the cavities in relation to the top surface and the width of the cavities, as well as the width of the grooves, is different from one breaker device to another, particularly if the width of the cavities and the grooves decreases from the upstream breaker member to the downstream breaker member. In an advantageous embodiment, each of the rollers is driven by a controlled drive system so that the speed of each roller of the machine can be adjusted separately. The drive system can advantageously comprise a separate motor for each roller.

In an advantageous embodiment, the second breaker member comprises a breaker wall with teeth inserted into the grooves of the rollers and controlled tooth spacing above the top surface of the rollers allowing specific clearance from this surface. The clearance could for instance be between 0.001 mm and 1 mm.

The teeth, particularly those of the first and possibly the second breaker device, can advantageously comprise a convex leading edge, forming a "V" shape for example, with a general angle of between 80° and 160°.

It is advantageous if the bottom surface of the grooves is higher than the bottom surface of the cavities. The static breaker device can be attached to an inlet guide in the shape of a funnel to guide the broken leaves onto the surface of the removable breaker member.

One angle $\Theta$ of the breaker wall in relation to an orthogonal plane on the surface of the first breaker member may specifically be between −50° and +60°.

BRIEF DESCRIPTION OF THE DRAWINGS

Other objectives and advantages of the invention can be seen from the claims or from the detailed description of one embodiment below, with reference to the accompanying figures, in which:

FIG. 2b is a side view of the machine shown in FIG. 2a;

FIG. 2c is a front view of the machine shown in FIG. 2a

FIG. 3 is a perspective view of part of the machine shown in FIG. 2a representing a breaker device seen from above;

FIG. 4 is a view of the rollers of a breaker device seen from above, in one alternative;

FIG. 6b is a plan view of the roller shown in FIG. 6a;

FIG. 6c is a view in the direction of the rotational axis of the roller shown in FIG. 6a;

FIG. 7a is a perspective view of a roller breaker for breaking the leaves into smaller pieces than the breaker roller shown in FIG. 6a;

FIG. 7b is a plan view of the roller shown in FIG. 7a;

FIG. 7c is a view in the direction of the rotational axis of the roller shown in FIG. 7a;

FIG. 8b is a plan view of the roller shown in FIG. 8a;

FIG. 8c is a view in the direction of the rotational axis of the roller shown in FIG. 8a;

FIG. 9a is a perspective view of a breaker wall of a machine according to one embodiment of the invention;

FIG. 9b is a plan view of the wall shown in FIG. 9a;

FIG. 9c is a view in the direction of arrow C shown in FIG. 9b;

FIG. 9d is a view in the direction of arrow D shown in FIG. 9b;

FIG. 10a is a perspective view of a breaker wall for breaking the leaves into smaller pieces than the breaker wall shown in FIG. 9a;

FIG. 10b is a plan view of the breaker wall shown in FIG. 10a;

FIG. 10c is a view in the direction of arrow C shown in FIG. 10b; and

FIG. 10d is a view in the direction of arrow D shown in FIG. 10b; FIG. 1a is a perspective view of a machine 4 for breaking the dried leaves of plants, and particularly dried tea leaves. The machine is part of a system 1 for packaging leaves, particularly tea, in a hermetically sealed casing 3. The machine comprises an inlet 11 for supplying the dried leaves, an outlet 12 for releasing the broken leaves and guiding them into the casing, and at least one breaker device 5a, 5b, 5c.

DETAILED DESCRIPTION OF THE INVENTION

In the embodiment illustrated, the machine 4 comprises multiple breaker devices assembled one on top of the other vertically. It would also be possible to position the breaker devices next to one another horizontally or in different positions, and to have a transport mechanism such as a conveyor belt to transport the leaves from one device to another.

In an advantageous embodiment, there are three breaker devices 5a, 5b and 5c.

The breaker devices can be installed in a cabinet 13, at least partially, the interior of the said cabinet being supplied with a neutral gas such as nitrogen in order to prevent the oxidation of the leaves or stalks at the time of breaking until their insertion into the casing. The neutral gas covers the breaker devices and the entire route taken by the broken leaf or stalk until it reaches the casing. The casings 3 are therefore also filled with a neutral gas before being hermetically sealed. This not only avoids the oxidation of the leaves or stalks during and after breaking, but also preserves their organoleptic properties and prevents microbial activity. The machine 4 can also be installed in an airlock in a controlled environment, particularly if a neutral gas such as nitrogen is used to fill the airlock.

Figure 5:
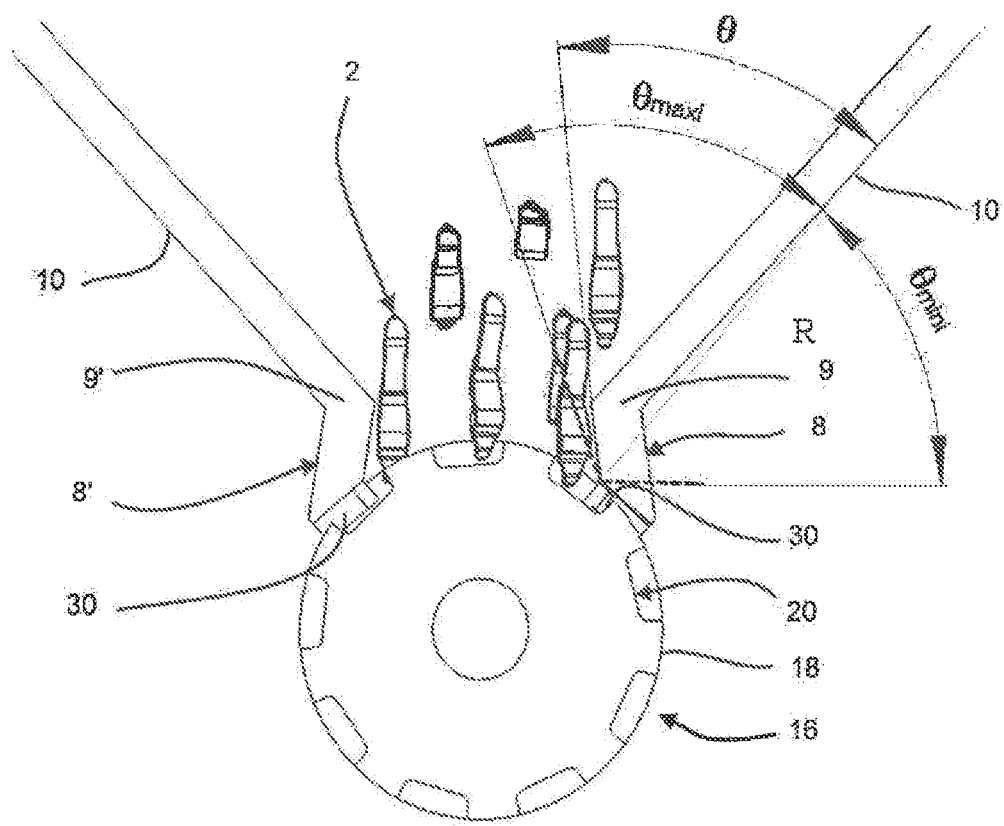
FIG. 5a is a detailed, schematic cross-sectional view of a breaker device of a machine for breaking dried leaves according to one embodiment of the invention.
FIGS. 5b and 5c illustrate parts of alternative breaker rollers.
FIG. 5d is a schematic illustration showing the teeth of a breaker wall engaging a breaking roller according to one alternative.
FIG. 5e is a schematic illustration indicating the dimensions of the teeth and grooves of a breaker device according to one alternative.

In one embodiment of the invention, each breaker device 5 comprises a removable breaker member 6 and a static breaker member 8. In an advantageous embodiment, the removable breaker member 6 comprises a motor 26 which causes roller 16a, 16b, 16c to rotate. The roller comprises active lines 22 with a cylindrical top surface 18 interrupted by cavities 20 designed to partially catch the leaves 2, as shown in FIG. 5. There are multiple active lines separated by grooves 24 around the roller. The cavities have a bottom surface 17 and radial surfaces 19 forming upper edges 21 with the top surface 18. The grooves 24 have a bottom surface 23 and lateral surfaces 25 forming side edges 27 with the radial surfaces 19 of the cavities 20.

It is advantageous if each of the rollers is driven by a separately controlled motor 26a, 26b, 26c so that the speed of each roller of the machine can be adjusted separately. The rotational speed of the rollers can be determined empirically depending on the type of dried leaf to be broken, for instance tea, but also depending on differences within a single type of product. These differences may concern the morphology of dried leaves of different origins, their moisture content or their resistance to breakage. In the different alternatives, it is however possible to have one or more motors working at constant speed, and a gearbox or coupling system of adjustable, controllable speed, to couple the motor or motors to the rollers.

It is advantageous if the depth Pa, Pb, Pc of the cavities 20 in relation to the top surface 18 and the width La, Lb, Le of the cavities, as well as the width Wa, Wb, We of the grooves is different from one breaker device to another.

The widths of the cavities and the grooves of the removable breaker member of the first device (upper member) 6a are larger than those of the second removable breaker member (intermediate member) 6b which are in turn larger than those of the third removable breaker member (lower member) 6c. The reduction in dimensions takes account of the fact that the dried tea leaves are broken in successive stages as they pass from each breaker roller to the breaker roller beneath, gradually decreasing in size. The top part of the leaf (not yet broken) should preferably bounce "autonomously" and fall back down to be broken without being crushed between the teeth of the roller and the sheet, i.e. solely as a result of bending.

The static breaker member 8, 8a, 8b, 8c comprises a breaker wall 9, 9a, 9b, 9c with teeth 30, 30a, 30c, inserted into grooves 24 between the lines 22 and tooth spacings 32, 32a, 32c just above the top surface, allowing specific, controlled clearance from this surface. The tooth spacings 32 can break the ends of dried tea leaves emerging radially over the upper edges 21 of the cavities 20. The teeth 30 can break the ends of dried tea leaves 2 emerging laterally from the cavities 20 over the side edges 27. The teeth 30 are also designed to push the leaves that fall into the grooves 24 laterally so that they will be fed in within the side edges 27 of the cavities 20. For this purpose, it is advantageous for the teeth 30 to have a convex-shaped leading edge 34, forming a "V" shape for example (see FIGS. 5d, 9a and 9c), to collect and push the leaves laterally so that they are more likely to be fed in with one end partially in the cavities 20. As far as the first roller 6a and the second roller 6b are concerned, the "V"-shaped leading edge can have a general angle that is preferably between 80° and 160°, for instance between 110° and 130°. In one alternative, the bottom surface 15 of the groove 24 can be higher than the bottom surface 17 of the cavities, in other words at an average depth in relation to the upper surface 18, but lower than the depth Pa, Pb, Pc of the cavities 20. This makes it easier to feed the leaves partially into the cavities 20 by helping them to fall into the cavities. The profile of the bottom surface 25 of the groove 24, seen as a longitudinal cross-section containing the rotational axis A of the roller, can be essentially straight, as illustrated, or slightly convex to help the tea leaves falling into the grooves to slide or be projected towards the cavities 20.

The static breaker member 8 can be integrally formed or attached to an inlet guide 10 in the shape of a funnel to guide the broken tea leaves onto the surface of the removable breaker member 6a, 6b, 6c, and to redirect towards the surface of the removable breaker member any tea leaves thrown up into the air on being broken.

In one advantageous method, the dried leaves or stalks, either whole or essentially whole, are fed onto the first roller 6a by a supply device 28 designed to generate a shower of leaves falling not too densely onto the surface of the removable breaker member between the inlet walls 10 and in particular between the breaker walls 9. The regular, fine shower of dried leaves covers the entire length of the first breaker member. The leaves fall individually onto the surface of the said first breaker member so that there is preferably only one leaf in each cavity 20 at a time, but a maximum of two or three. The supply device can comprise a grid or other vibrating tray to release the leaves one after another and generate a regular, fine shower of dried leaves. If the density of the leaves falling onto the first removable breaker member 6a is too high, the cavities 20 may become blocked and the leaves will not be broken in the optimal manner. Even if the cavities 20 do not become blocked, the leaves are only broken in the optimal manner if one, or no more than two or three leaves, are in a cavity 20 in order to prevent the leaves from piling up and being compressed between the upper edges 21 and side edges 27 of the cavity 20 and the static breaker member 8 when the edges meet the static breaker member, which could reduce the effectiveness of the breaking process. A leaf typically bounces along the breaker member several times. Breaking leaves by crushing or shearing releases thermal energy which is harmful to the properties of the surface exposed after breaking, whereas breaking each leaf individually by bending, as in this invention, involves exposing a very large surface on breaking the leaf and releasing a minimum of thermal energy.

To prevent the leaves from piling up, and hence the top part of the leaf from being crushed (i.e. the part above the part being broken), the leaf must remain "isolated", which is why it is so important to ensure the optimum adjustment of the "shower of leaves". The shower of leaves can be adjusted manually by the operator (optimum balance between the speed of the rollers, that of the distribution vibrators, and the shower effect), or according to parameters determined during tests carried out beforehand depending on the type of leaf and its moisture content. It is therefore advantageous if the speed of each roller can be adjusted separately from that of the other rollers. As already stated, differences in moisture content or breakage resistance have an effect on the speed adjustment. A leaf bounces several times, on several rollers.

Figure 1A:
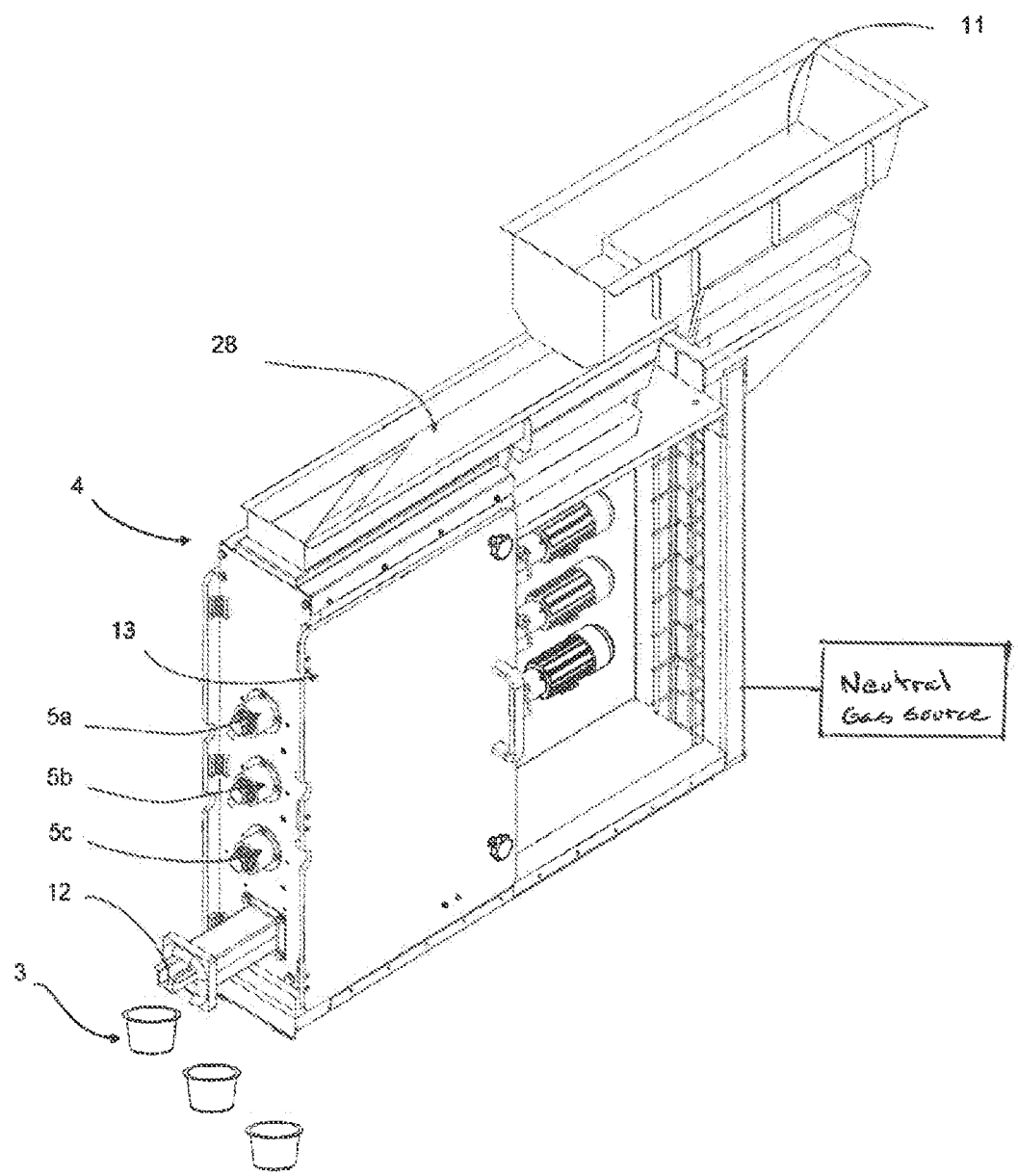
FIG. 1a is a perspective view of a machine for packaging dried leaves, particularly tea, in casings, according to one embodiment of the invention.
Figure 1B:
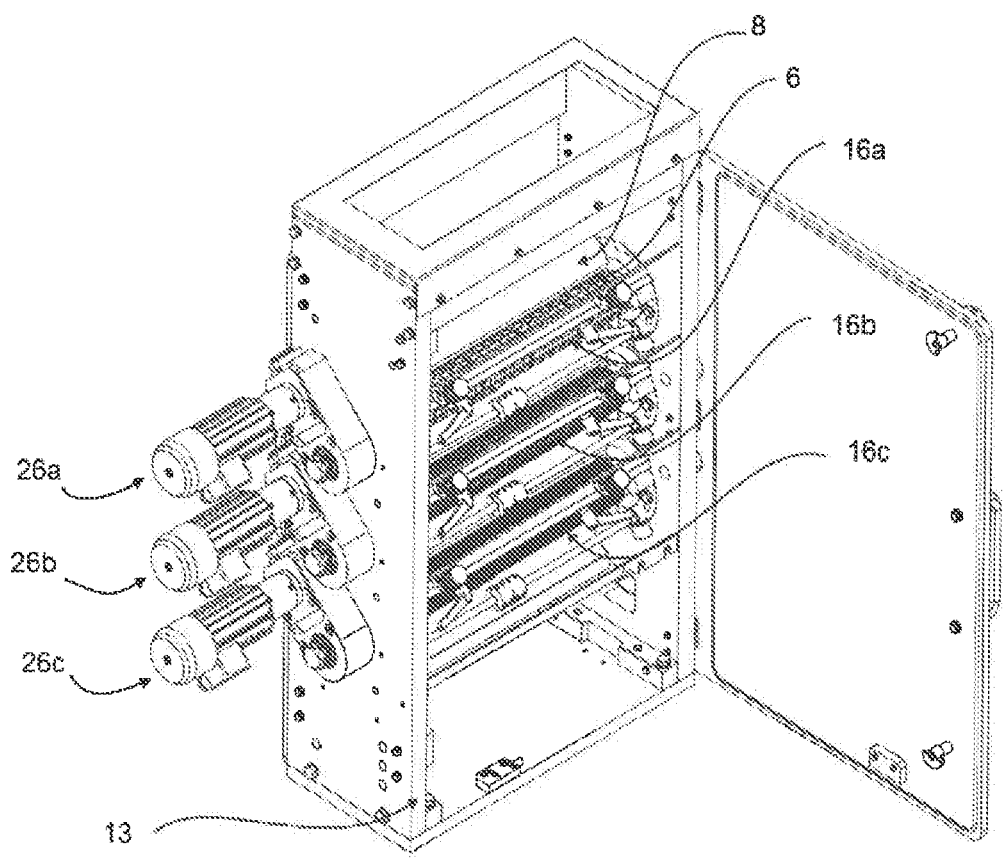
FIG. 1b is a perspective view of the machine with part of the outer structure removed to better illustrate the machine.
Figure 1C:
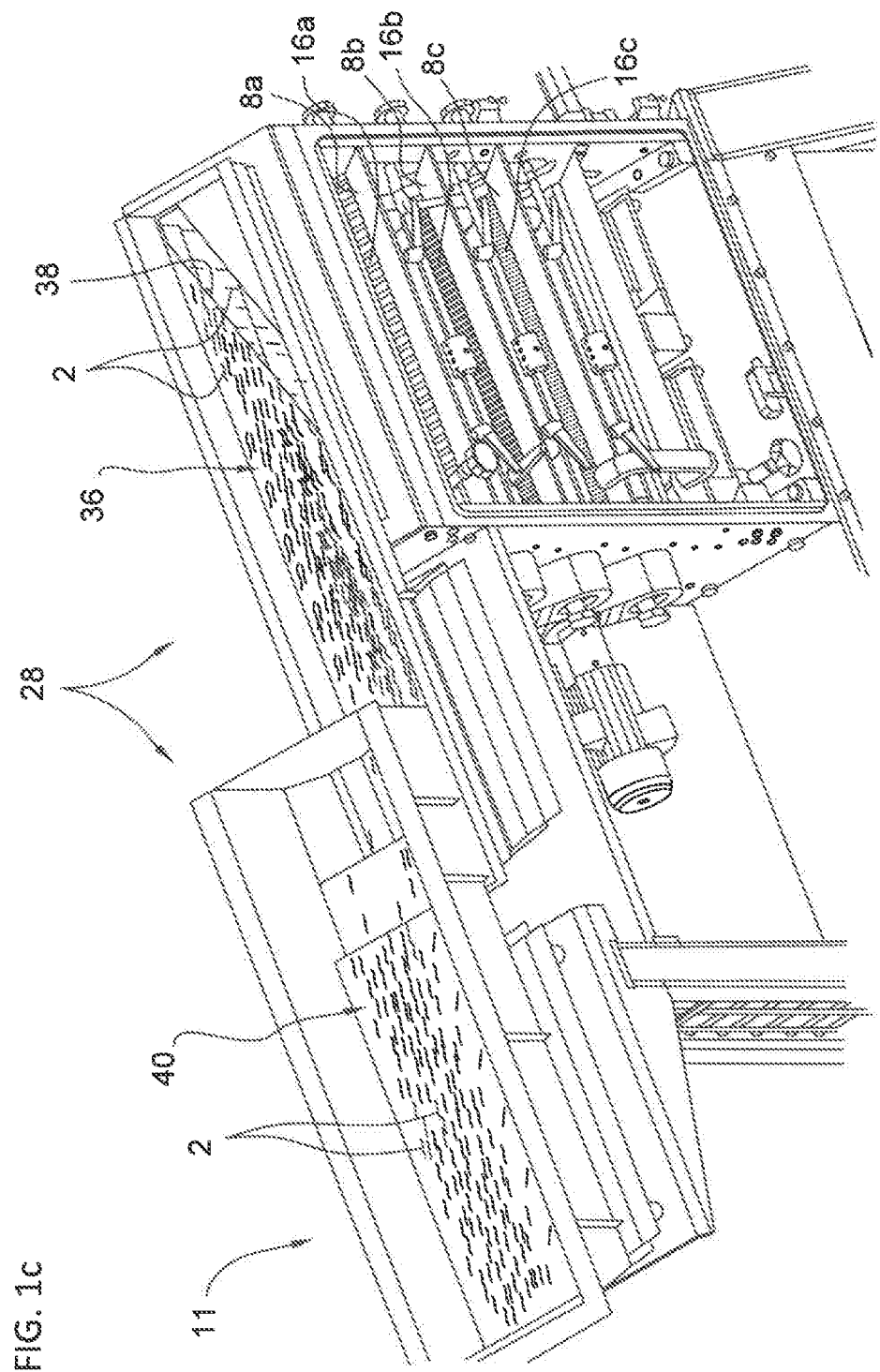
FIG. 1c is a perspective view of the machine according to FIG. 1a, showing a supply device of the machine in more detail.
Figure 2A:
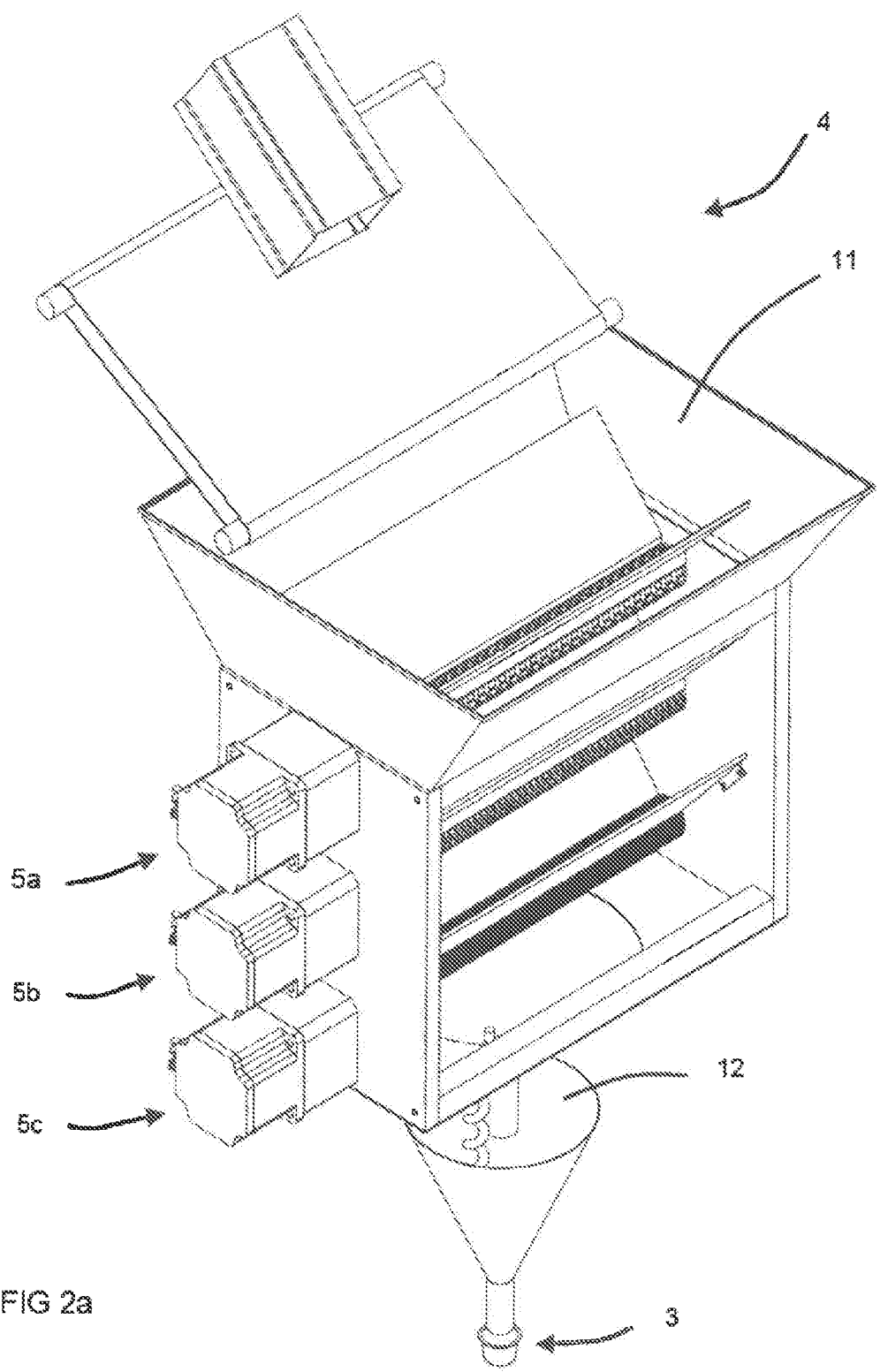
FIG. 2a is a perspective view of a machine for packaging dried leaves, particularly tea, in casings, according to one embodiment of the invention.
Figure 2B:
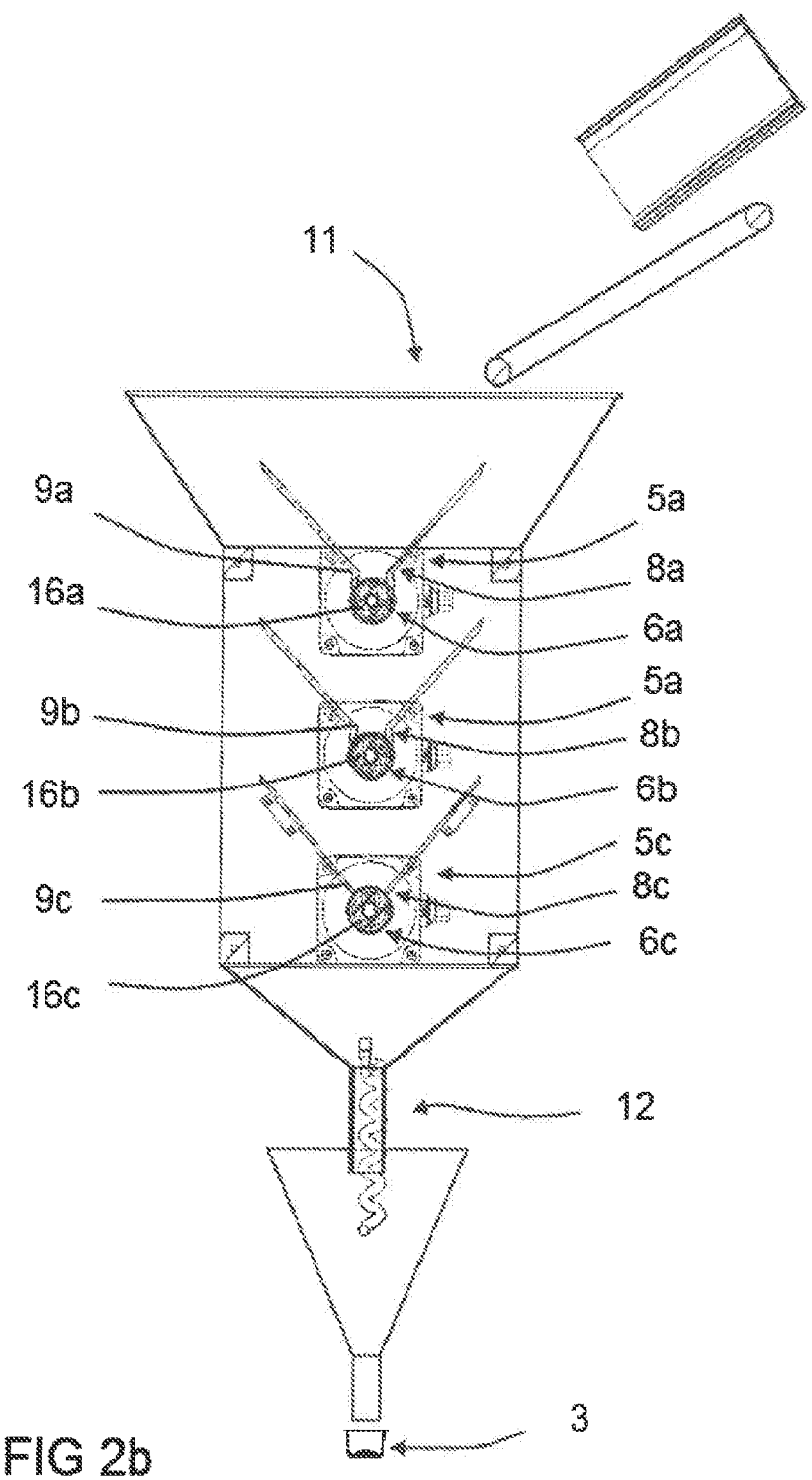

With reference to FIGS. 1a and 1c, the supply device 28, in an advantageous embodiment, comprises a vibrating tray 36 with an overflow edge 38 covering the entire length of the first roller and positioned above the first roller 16a. In the embodiment illustrated, the leaves are fed in according to the axis of the breaker roller, the overflow edge being placed at an oblique angle in relation to the axis so that the edge covers the entire length of the roller. It is also possible to supply the leaves transversally in relation to the rotational axis of the breaker roller, as is the case for example in the supply device illustrated in FIG. 2a.

The supply device 28 can also comprise one or more vibrating trays 40 upstream from vibrating tray 36, the upstream vibrating trays preventing the dried leaves or stalks from piling up and separating them before feeding them onto vibrating tray 26. This arrangement helps to control and adjust the distribution of the leaves or stalks and ensures optimum spacing between them before they reach the overflow edge 38 so that a fine shower of leaves falls onto the first breaker device, a single leaf or stalk falling into a cavity of the breaker device at a time.

Figure 5B:
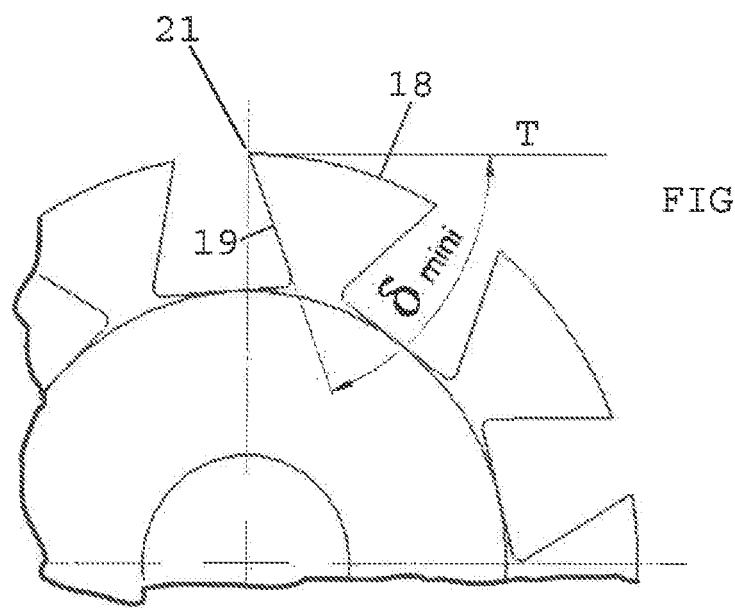
Figure 5C:
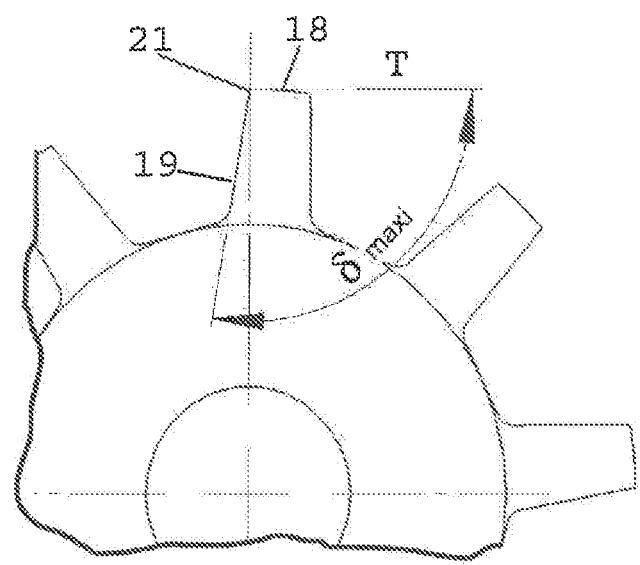
Figure 5D:
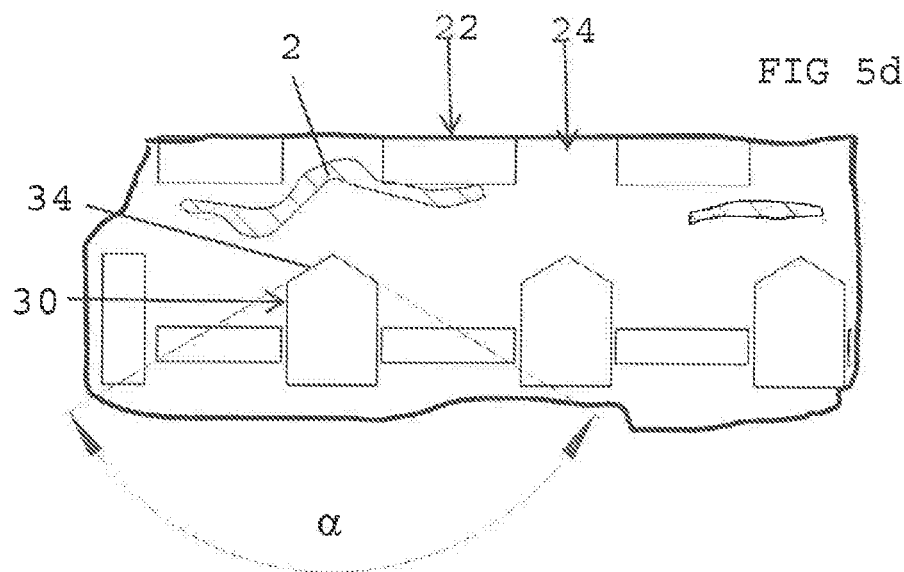

With reference to FIG. 5a, the angle $\Theta$ of the breaker wall 8 in relation to the radial direction R, at the intersection between the breaker wall and the upper surface 18 of the roller, may specifically be between $-50°$ ($\Theta$ min.) and $+60°$ ($\Theta$ max.). With reference to FIGS. 5b and 5c, the angle $\delta$ between the radial surface 19 of the cavities 20 and the plane 7 tangential to the upper surface 18 may specifically be between $30°$ and $125°$. Angle $\delta$ can vary depending on angle $\Theta$ given that both of these angles influence the position of the support points applied to a dried leaf caught between the breaker wall 9 and the tooth 30 on one side, and the upper edge 21 of the radial surface 19 on the other, as well as the free space allowing the leaf to bend. The aim is to cause the leaf to break by bending rather than as a result of a sharp break or grinding or crushing.

Figure 5E:
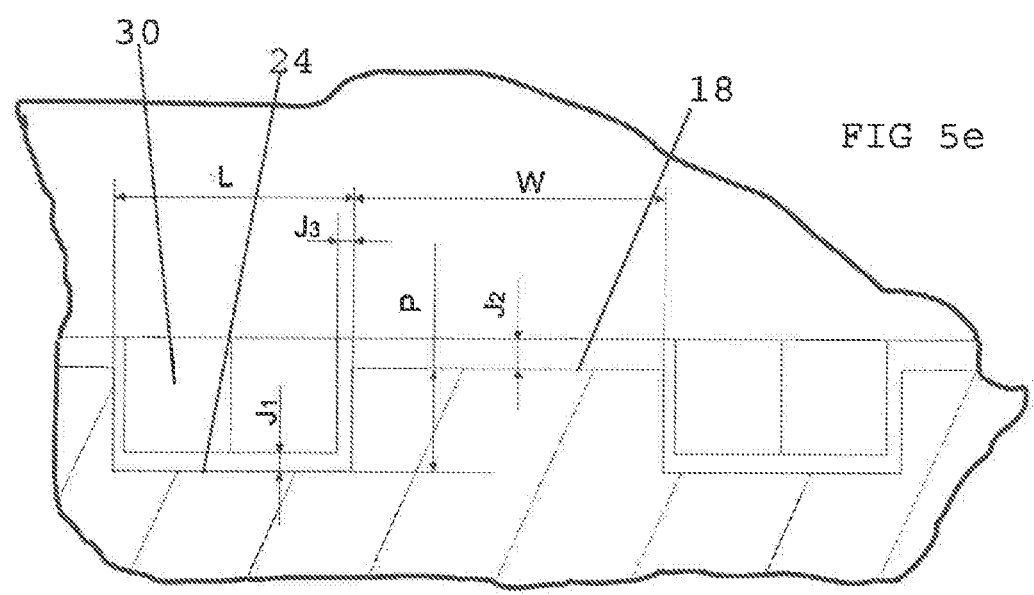
Figure 6A:
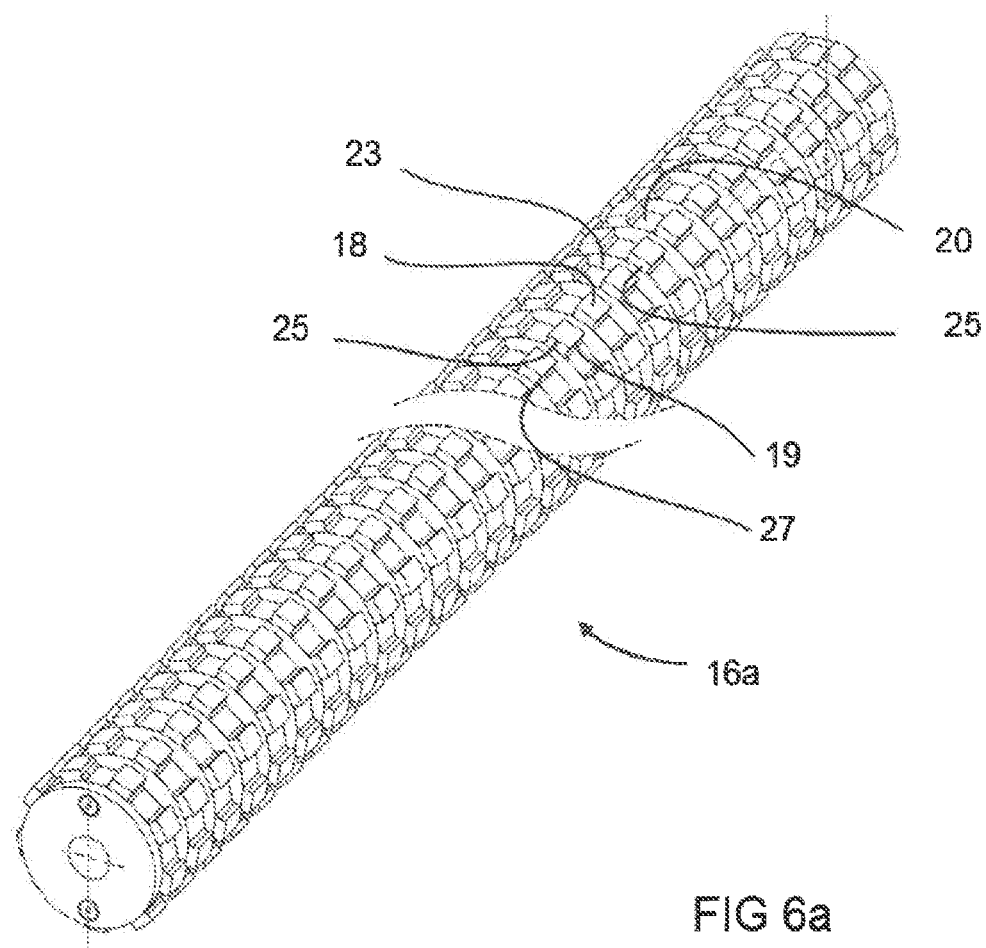
FIG. 6a is a perspective view of a roller of a breaker device of a machine according to one embodiment of the invention.
Figure 6C:
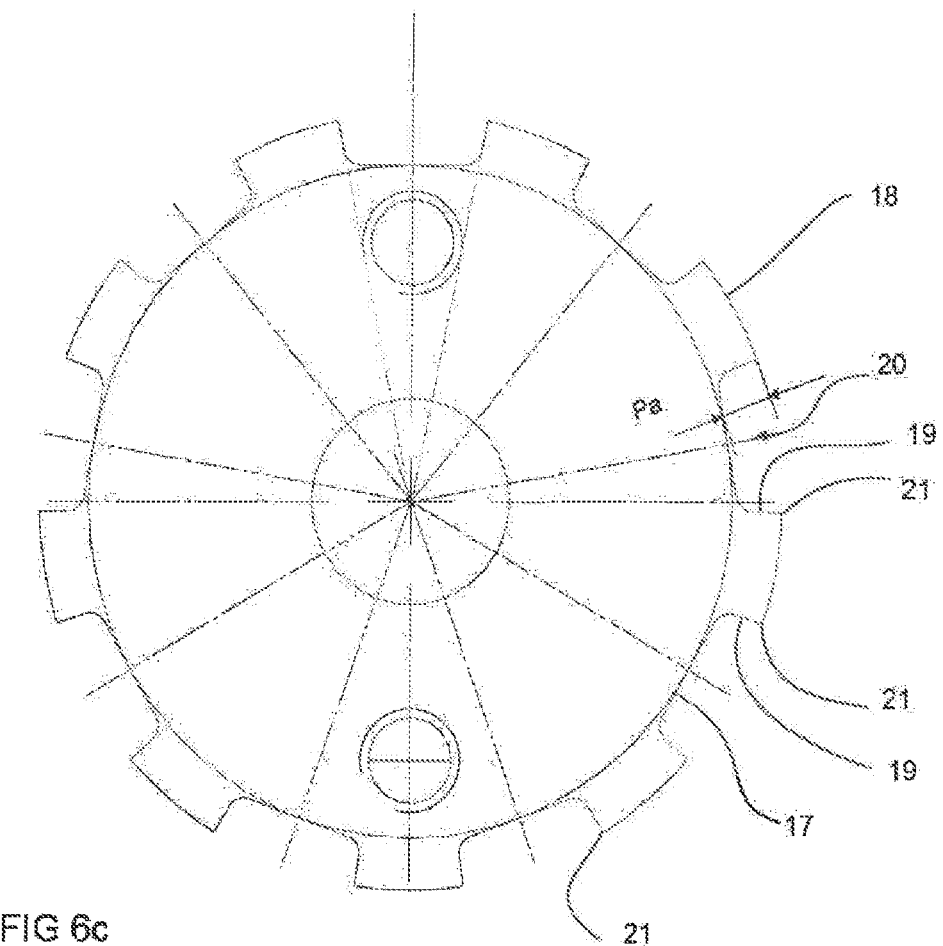
Figure 7A:
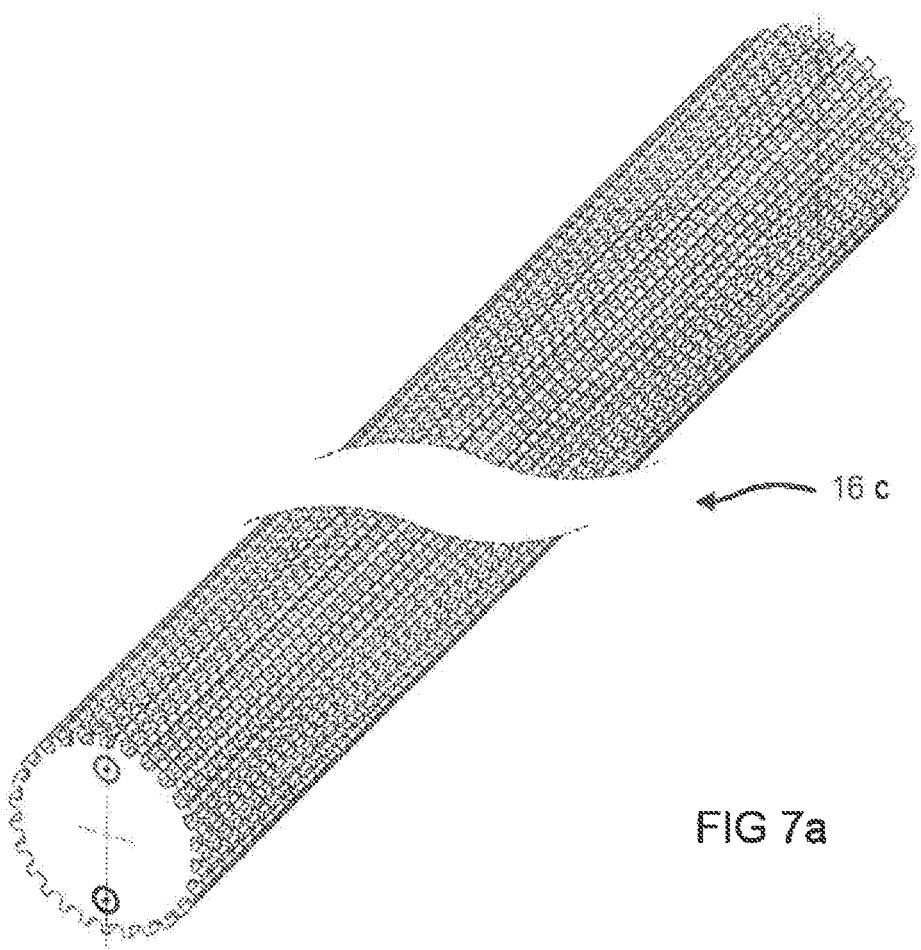
Figure 7C:
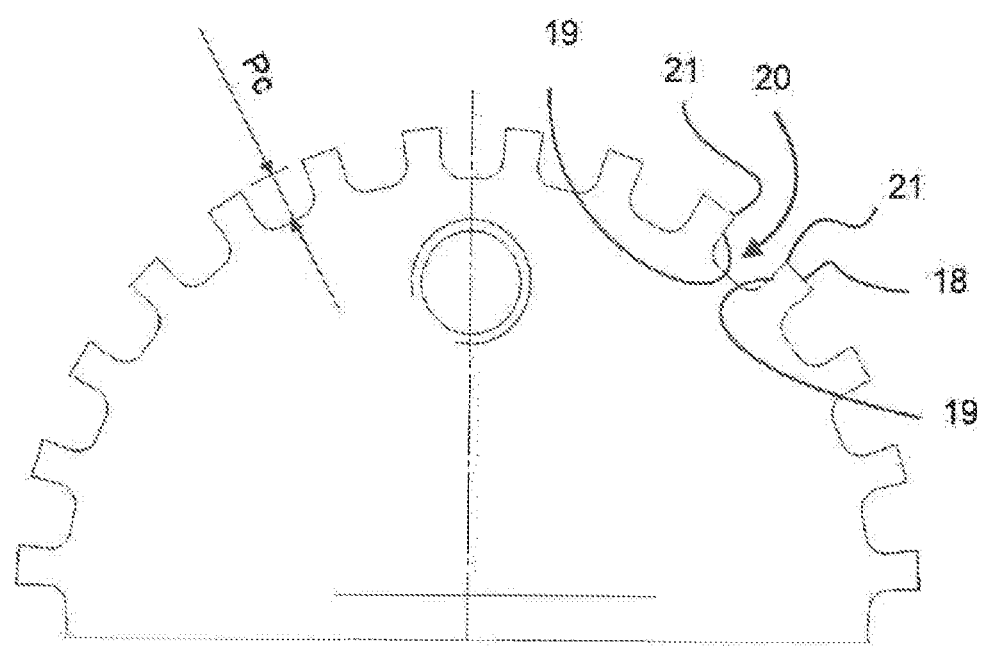
Figure 8A:
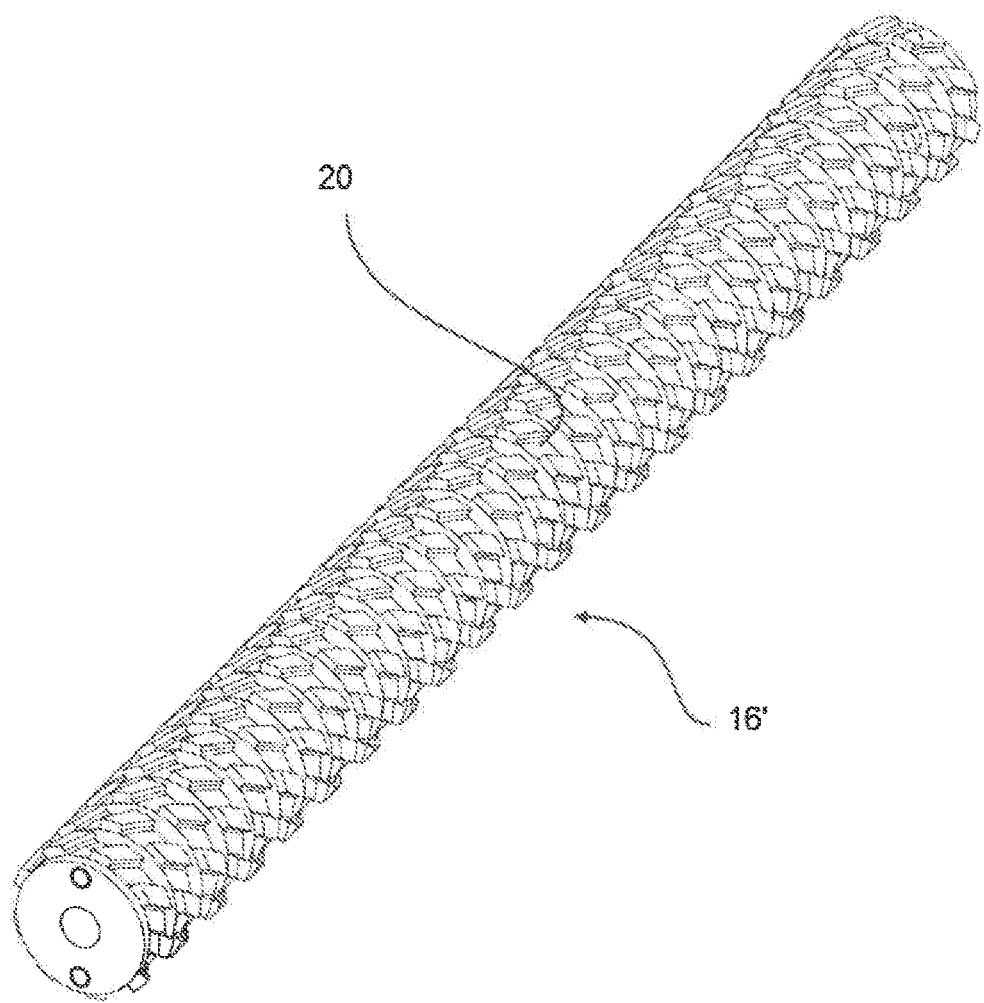
FIG. 8a is a perspective view of a roller of a breaker device of a machine according to another embodiment of the invention.
Figure 8C:
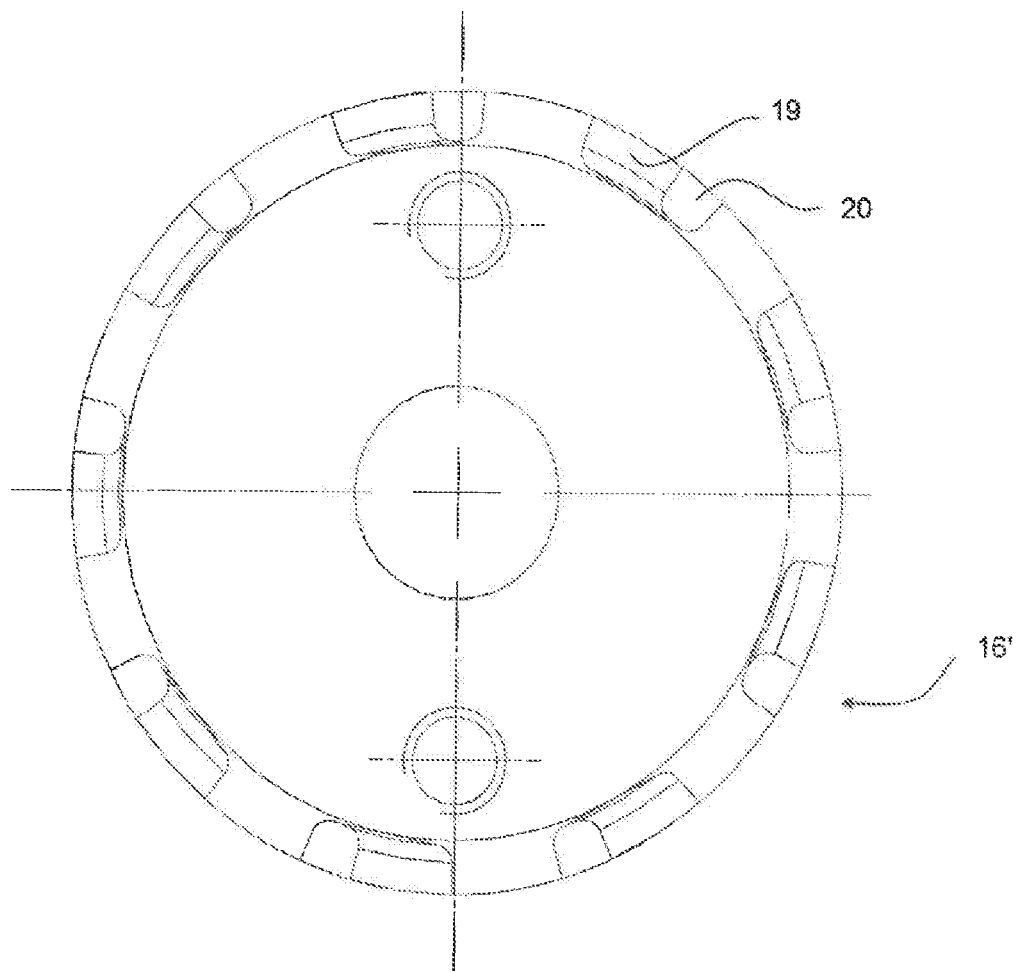

With reference to FIG. 5e, clearances j1, 2, 3 between the end 30 of the breaker wall and the top surface 18 of line 22 of the removable breaker member are preferably between 0.001 mm and 1.8 mm. The angle $\Theta$ of the breaker wall 9, the angle at the leading edge of the teeth, the clearances j1, j2, j3 and the dimensions of the cavities 20 and of the grooves 24 are designed so that a tea leaf 2 falling into the cavity 20 becomes caught between the breaker wall and the upper edge 21 or the side edge 27 of the cavity 20. The leaf is then bent until it breaks when roller 6 turns and the cavity moves against breaker wall 9. When a leaf breaks, it tends to be a sudden, irregular break, particularly if it is caused by bending a dried leaf until it breaks. This is different from a sharp break or cut, or a break obtained by grinding or crushing a leaf.

In the invented system, the aim is to avoid grinding the leaves or causing a sharp cut or break. Firstly, the exposed surface of a broken leaf is irregular and rough, making it much larger than that of a cut leaf. The major advantage of this is that breaking tea leaves by bending in a non-oxidizing environment, i.e. without oxygen, prevents the oxidation of the surface and enables the leaf to absorb water extremely quickly in order to extract the substances from the tea and prepare a beverage. Not only can these substances be extracted very quickly, but the subtle aromas are also preserved by preventing the oxidation of the exposed surfaces when the leaves are bent by breaking. Moreover, the surface of a tea leaf that has been cut or ground undergoes intense localized heating, the effect of which is to repair the cut or ground surface and reduce its ability to quickly absorb water and to quickly release the soluble substances contained in the tea leaf. Breakage by bending generates less thermal energy at the broken surface, and this surface therefore remains more porous to the absorption of water and the release of soluble products. The aroma of the tea is altered less by avoiding localized heating of the broken surface. Tea leaves from different regions have different mechanical properties, dimensions and moisture contents.

As a result, the necessary parameters for breaking the leaves in the optimal manner may vary. Machine 4 therefore has a driver system designed to control the rotational speed of the removable breaker members, preferably to control the rotational speed of each breaker member separately. The driver system can comprise one or more motors and possibly one or more mechanisms such as one or more gearboxes to control the rotational speeds. In the alternative illustrated, the machine 4 comprises motors 26a, 26b, 26c for driving the removable breaker members 6a, 6b, 6c, which are controlled separately. The speed of each breaker roller is determined by the speed of each corresponding motor coupled to the respective roller. The optimal speed for each of the breaker rollers can be determined for each type of tea by means of empirical measurement. For example, very dry, very brittle tea leaves can be broken with faster rotational speeds of rollers 16a, 16b and 16c than for more elastic, less brittle leaves. It is therefore possible to vary the angle Θ of the wall and the clearance between the upper surface and the tooth spacing part of the breaker wall according to the elasticity, dimensions, density, moisture content and other characteristics of the tea leaves. It is also possible to replace the breaker walls and rollers in order to change the dimensions and angles of the grooves, cavities and teeth depending on the dimensions and mechanical properties of the type of leaves to be packaged into casings. The speed of the breaker rollers may also depend on the speed at which the dried leaves are fed in by the upstream supply device in order to prevent several leaves from piling up in the cavities of the rollers. Ideally, the aim is to ensure that a single leaf falls into each cavity of the breaker rollers at a time in order to ensure optimum breaking by bending, without crushing. The optimum speeds of the breaker rollers, which depend in particular on the characteristics of the leaves to be packaged and on the speed at which they are fed in, can be adjusted empirically by carrying out analyses on the broken leaves leaving the machine.

When the dried leaves or stalks 2 fall into the cavities, the parts emerging from the cavity above the upper surface 18 or laterally over the edge will be broken when they come into contact with the breaker wall. Part of the broken leaf or stalk probably remains in the cavity and the other part is probably thrown up into the air before falling back down onto the surface of the removable breaker member. If the part thrown up into the air is still longer than the depth or the width of the cavity 20, it can be broken again. With regard to the part of the broken leaf or stalk that remains in the cavity 20 when the cavity passes under the breaker wall 9, this part of the leaf or stalk falls from the cavity into the inlet guide 10b of the breaker member positioned beneath it and is then broken further into smaller pieces. By means of the multiple removable breaker members assembled one on top of the other, the tea leaves can be broken into smaller and smaller pieces in successive stages in order to package small pieces of broken tea leaves forming a very large non-oxidised surface of absorption. The time needed to extract the substances contained in the tea or other edible plant is therefore reduced to less than 30 seconds compared to an extraction time of several minutes for a traditional method of preparing tea. As a result, the substances extracted are of greater organoleptic quality than those extracted from traditional tea leaves or other edible plants. In one alternative, breaker devices can also be assembled horizontally, one next to the other, or spaced out, and the broken leaves or stalks are transported from one device to another via a means of transport such as a conveyor, a vibrating plate or a system of blown gas. The cavities 20 can have active lines and grooves that are orthogonal in relation to the rotational axis A as illustrated in FIG. 3, but in one alternative (not illustrated), the active lines and grooves may form a helix around the roller.

In one alternative, the radial walls 19 on both sides of the cavities 20 are essentially parallel to the rotational axis of the rollers, as illustrated in the embodiment in FIGS. 3 and 6a to 6c. In another alternative, the walls 19 can be placed at an oblique angle φ in relation to the direction of the rotational axis, as illustrated in FIGS. 4 and 8a to 8c, the oblique angle φ preferably being between 10° and 35° in relation to the direction of the rotational axis.

Upholding the purpose of the invention, a method of breaking the dried leaves or stalks of tea or other plants can be implemented by embodiments of breaker members other than those illustrated. Instead of a roller, the removable breaker member can for instance be an essentially flat member, fitted with cavities and oscillating from side to side in relation to a breaker wall. A pair of corrugated sheets or sheets with opposing jagged edges or opposing cavities and protuberances could also be used as breaker members. The dried tea leaves would land in the cavities of one of the sheets, and the protuberances of the other sheet would fit into the cavities in order to bend the leaves until they break, the aim being to cause the leaves to break by bending rather than as a result of a sharp break or grinding of the leaves. It would also be possible to have two removable breaker members. Example:

An example of a specific configuration of the breaker walls and rollers based on an embodiment such as that illustrated in FIGS. 1a to 2c for packaging dried tea leaves can have parameters (shown in FIGS. 5a-5e, 6b, 6c, 7b, 7c) with values close to the following values:

| Parameter | First roller: | Second roller: | Third roller: |
| --- | --- | --- | --- |
| α | 120° | 120° | 120° |
| Θ | 45° | 45° | 45° |
| δ | 90° | 90° | 90° |
| W | 11.8 mm | 4.3 mm | 2.8 mm |
| P | 3 mm | 3 mm | 2.5 mm |
| L | 6.7 mm | 4.7 mm | 1.7 mm |
| J1 | 1.5 mm | 1.4 mm | 1.3 mm |
| J2 | 1.5 mm | 1.4 mm | 1.3 mm |
| J3 | 0.1 mm | 0.1 mm | 0.1 mm |

The invention claimed is:

1. A method of packaging dried leaves and/or stalks of plants in a hermetically sealed casing comprising:
   breaking the dried leaves and/or stalks in an environment of non-oxidising gas, the breaking including using a machine for breaking the dried leaves and/or stalks, wherein the machine comprises a first breaker device with a first breaker member and a second breaker member, wherein said first breaker member is formed as a roller drivable with controllable rotational speed, wherein the roller comprises active lines with an essentially cylindrical outer surface interrupted by cavities configured to catch the dried leaves and/or stalks, the active lines being separated by grooves around the roller, wherein said second breaker member comprises a breaker wall with teeth configured to be inserted into the grooves of the roller, wherein said first and second breaker members are arranged so that the dried leaves and/or stalks falling into a cavity of said cavities of the first breaker member are caught between the breaker wall and an upper edge or a side edge of said cavity and are bent until the dried leaves and/or stalks break when said roller turns and said cavity moves against said breaker wall, the machine further comprising a supply device for feeding the dried leaves and/or stalks to the first breaker member with a controllable speed of feeding, inserting the broken leaves and/or stalks into a casing in the environment of non-oxidising gas, hermetically sealing the casing, and controlling said rotational speed and said speed of feeding so that said dried leaves and/or stalks fall individually in a distributed shower onto said first breaker device so that breaking the dried leaves and/or stalks solely involves bending said dried leaves and/or stalks until said dried leaves and/or stalks break and so that cutting, grinding or crushing of said dried leaves and/or stalks is avoided, including controlling the rotational speed of the roller in dependency on the speed of feeding of said supply device so that piling up of the leaves and/or stalks in the cavities of the roller is prevented, the method including preventing oxidation of the dried leaves and/or stalks from a time of breaking the dried leaves and/or stalks through the inserting of the broken leaves and/or stalks into the casing.

2. The method according to claim 1, comprising a plurality of stages for breaking the dried leaves and/or stalks, wherein each subsequent stage of the plurality of stages breaks the leaves and/or stalks into smaller pieces than the previous stage.

3. The method according to claim 1, wherein the dried plant leaves and/or stalks are dried tea leaves.

4. The method of claim 1, wherein the machine comprises an inlet for supplying the dried leaves and/or stalks, an outlet for releasing the broken dried leaves and/or stalks, and the breaker device including the first breaker member and the second breaker member wherein the second breaker member can be removed relative to the first breaker member, wherein the machine comprises a source of non-oxidising gas designed to provide the environment of non-oxidising gas in the machine, including said first breaker device, which prevents the oxidation of the leaves and/or stalks at the time of breaking until said dried leaves and/or stalks are inserted into the casing.

5. The method according to claim 1, including controlling the rotational speed of the roller and the speed of feeding so that a single leaf or stalk at a time falls into a respective cavity of the roller.

6. The method according to claim 1, including empirically adjusting the rotational speed of the roller and the speed of feeding to ensure breaking by bending, without crushing.

7. The method according to claim 2, wherein said plurality of stages for breaking the dried leaves and/or stalks comprise in each stage a breaker member formed as a roller having cavities and being drivable with a controllable rotational speed, wherein the rotational speed of each breaker member is separately controlled.

8. The method according to claim 1, wherein said breaker wall allows adjustment of a specific clearance from the outer surface of the roller.

9. The method according to claim 8, wherein the clearance is between 0.001 mm and 1 mm.

10. The method according to claim 1, wherein said teeth of said breaker wall each have a leading edge that forms a V-shape having an angle between 80° and 160°.

* * * * *